(12) United States Patent
Hochman et al.

(10) Patent No.: US 9,660,403 B2
(45) Date of Patent: May 23, 2017

(54) CONNECTOR FOR DEVICES FOR CREATING MOSAICKED DISPLAY SYSTEMS, AND DISPLAY MOSAIC SYSTEMS COMPRISING SAME

(71) Applicant: Revolution Display, LLC, Glendale, CA (US)

(72) Inventors: Jeremy Hochman, Walnut, CA (US); Robbie Thielemans, Nazareth (BE); Steve Danko, Newbury Park, CA (US)

(73) Assignee: Revolution Display, LLC, Glendale, CA (US)

( * ) Notice: Subject to any disclaimer, the term of this patent is extended or adjusted under 35 U.S.C. 154(b) by 0 days.

(21) Appl. No.: 15/291,684

(22) Filed: Oct. 12, 2016

(65) Prior Publication Data

US 2017/0093106 A1 Mar. 30, 2017

Related U.S. Application Data

(62) Division of application No. 15/017,865, filed on Feb. 8, 2016, now Pat. No. 9,477,438.

(Continued)

(51) Int. Cl.
*H01R 31/06* (2006.01)
*H01R 13/24* (2006.01)
(Continued)

(52) U.S. Cl.
CPC ......... *H01R 31/065* (2013.01); *G06F 3/1446* (2013.01); *G09G 5/006* (2013.01);
(Continued)

(58) Field of Classification Search
CPC H01R 31/065; H01R 13/2407; H01R 13/504; H01R 13/506; H01R 13/665;
(Continued)

(56) References Cited

U.S. PATENT DOCUMENTS 7,355,562 B2 4/2008 Schubert et al.
D581,380 S 11/2008 Derocher et al.
(Continued)

FOREIGN PATENT DOCUMENTS

WO 2009069076 A2 6/2009
WO 2014070684 A1 5/2014

OTHER PUBLICATIONS https://resin.io/blog/good-better-beast-week-3/ (Last viewed Jun. 20, 2016).

(Continued)

*Primary Examiner* — Edwin A. Leon
(74) *Attorney, Agent, or Firm* — Downs Rachlin Martin PLLC

(57) ABSTRACT

Discrete electronic modules, such as display tiles, designed and configured to be mosaicked and operatively connected with one another and/or to one or more differing types of discrete electronic modules. In some embodiments, the electronic modules include one or more recessed receptacles along their edges that receive corresponding connector biscuits that operatively connect abutting or confronting electronic modules with one another and/or to a controller. In some embodiments, the sizes of the recessed receptacles and connector biscuits are precisely matched so that the biscuits participate in aligning the abutting or confronting display tiles with one another. In some embodiments, the recessed receptacles are provided in recesses in the backsides of the display tiles, which allows each tile to be easily installed and removed from a display mosaic of which the tile is part.

20 Claims, 11 Drawing Sheets

Related U.S. Application Data

(60) Provisional application No. 62/232,839, filed on Sep. 25, 2015.

(51) Int. Cl.

| | | |
|---|---|---|
| *H01R 13/504* | (2006.01) | |
| *H01R 13/506* | (2006.01) | |
| *H01R 13/66* | (2006.01) | |
| *G06F 3/14* | (2006.01) | |
| *G09G 5/02* | (2006.01) | |
| *G09G 5/00* | (2006.01) | |
| *H01R 107/00* | (2006.01) | |

(52) U.S. Cl.
CPC ........... *G09G 5/02* (2013.01); *H01R 13/2407* (2013.01); *H01R 13/504* (2013.01); *H01R 13/506* (2013.01); *H01R 13/665* (2013.01); *H01R 13/6691* (2013.01); *G09G 2300/026* (2013.01); *G09G 2320/0666* (2013.01); *G09G 2330/021* (2013.01); *H01R 2107/00* (2013.01); *H01R 2201/06* (2013.01)

(58) Field of Classification Search
CPC .. H01R 13/6691; G06F 3/1446; G09G 5/006; G09G 5/02
USPC .......................................................... 439/39
See application file for complete search history.

(56) References Cited

U.S. PATENT DOCUMENTS

| | | | |
|---|---|---|---|
| D590,789 S | 4/2009 | Pozin et al. | |
| 8,136,277 B2 | 3/2012 | Patterson et al. | |
| 8,197,088 B2 | 6/2012 | Patterson et al. | |
| D672,168 S | 12/2012 | Davis | |
| 8,485,689 B2 | 7/2013 | Patterson et al. | |
| 2005/0178034 A1 | 8/2005 | Schubert et al. | |
| 2008/0037284 A1 | 2/2008 | Rudisill | |
| 2008/0141572 A1 | 6/2008 | Tomich et al. | |
| 2008/0220632 A1* | 9/2008 | Chang ................. | H01R 13/514 439/74 |
| 2008/0220655 A1* | 9/2008 | Liao ..................... | H01R 13/22 439/629 |
| 2008/0280464 A1* | 11/2008 | Hsu ..................... | H01R 13/502 439/71 |
| 2012/0159819 A1 | 6/2012 | Patterson et al. | |
| 2013/0181884 A1 | 7/2013 | Perkins et al. | |
| 2014/0137384 A1 | 5/2014 | Patterson et al. | |

OTHER PUBLICATIONS http://www.led-lightlink.com/4-2-1-led-video-floor.html/139030 (Last viewed on Jun. 20, 2016).
http://otssigns.net/blog/ (Last viewed on Jun. 20, 2016).
https://iceledscreens.wordpress.com/2013/06/11/building-your-massive-led-screen-strip-by-strip/ (Last viewed on Mar. 20, 2016).
https://www.christiedigital.com/en-us/digital-signage/products/microtiles (Last viewed on Jun. 20, 2016).
http://www.verypixel.com/service/LED_Display_Installation.html (Last viewed on Jun. 20, 2016).
http://www.ledinside.com/knowledge/2015/6/led_signage_industry_adapt_or_die (Last viewed on Jun. 20, 2016).
http://www.ergotron.com/ProductsDetails/tabid/65/PRDID/791/language/hi-IN/Default.aspx (Last viewed on Jun. 20, 2016).
http://www.audipack.com/products/rid/98959/prid/74238/prname/flat_panel_video_wall_floor_stand_quick_release.html (Last viewed on Jun. 20, 2016).
http://www.bbslighting.com/products/area-48-led-detachable-barndoor-frame (Last viewed on Jun. 20, 2016).
https://web.archive.org/web/20160616231057/http://www.dgiled.com/product_show.asp?id=352&dasid=117&Immc=DGiLED+UHD+Tiles (Jun. 16, 2016).
https://web.archive.org/web/20151124042701/http://www.absen.com/pro/detail_101029001004_100000121043229.html (Nov. 24, 2015).
Extended European Search Report dated Jan. 25, 2017, in connection with European Patent Application No. 16168934.4, filed May 10, 2016.
Extended European Search Report dated Jan. 25, 2017, in connection with European Patent Application No. 16168945.0, filed May 10, 2016.
Extended European Search Report dated Jan. 25, 2017, in connection with European Patent Application No. 16168956.7, filed May 10, 2016.

* cited by examiner

CONNECTOR FOR DEVICES FOR CREATING MOSAICKED DISPLAY SYSTEMS, AND DISPLAY MOSAIC SYSTEMS COMPRISING SAME

RELATED APPLICATION DATA

This application is a divisional of U.S. Nonprovisional application Ser. No. 15/017,865, filed on Feb. 8, 2016, and titled "Devices for Creating Mosaicked Display Systems, and Display Mosaic Systems Comprising Same", which application claims priority to U.S. Provisional Application Ser. No. 62/232,839, filed on Sep. 25, 2015, and titled "Electrical Connector Biscuits And Modular Electronics Utilizing Same." Each of these applications is incorporated herein by reference in its entirety.

FIELD OF THE INVENTION

The present invention generally relates to the field of modular electronics. In particular, the present invention is directed to devices for creating mosaicked display systems, and display mosaic systems comprising same.

BACKGROUND

Modular electronics, i.e., electronic systems composed of discrete components that are electrically connected together to form an overall system, are used in a variety of applications. For example, large electronics graphical displays, such as video screens for stadiums and other large performance venues, electronic advertising billboards, and other electronic displays are often composed of display modules, or "display tiles," that are assembled into large arrays or mosaics that form an overall composite electronic display. Present means for securing discrete display tiles to support structures typically involve mechanical fastening of one sort or another, and present means for electrically connecting the discrete tiles to display controllers often involve separate wiring harnesses and/or electrical connectors that require the tiles to be in a specific rotational orientation.

SUMMARY OF THE DISCLOSURE

In one implementation, the present disclosure is directed to a connector designed and configured to operatively connect together first and second electronic modules, wherein the first electronic module includes a first back face and a first recess formed in the first back face and containing a first recessed receptacle having one or more first interface points and a first interior shape, and the second electronic module includes a second back face and a second recess formed in the second back face and containing a second recessed receptacle having one or more second interface points and a second interior shape. The connector includes a rigid body having first and second ends spaced from one another, wherein the first end is designed and configured to matingly engage the first recess and has a first exterior shape that conformally abuts the first interior shape when the first end is matingly engaged with the first recess; and the second end is designed and configured to matingly engage the second recess and has a second exterior shape that conformally abuts the second interior shape when the second end is matingly engaged with the second recess; at least one third interface point located at the first end of the rigid body, the at least one third interface point designed and configured to operatively interface with the at least one first interface point of the first recessed receptacle on the first electronic module when the first end is matingly engaged with the first recess; and at least one fourth interface point located at the second end of the rigid body, the at least one fourth interface point designed and configured to operatively interface with the at least one second interface point of the second recessed receptacle on the second electronic module when the second end is matingly engaged with the second recess.

In another implementation, the present disclosure is directed to a an electrical connector designed and configured to electrically connect together first and second electronic modules that abut one another. The electrical connector includes a body having first and second ends spaced from one another; a back side designed and configured to confront a support structure when the electrical connector is deployed for use; and a front side spaced from the back side; means for securing the body to the support structure when the electrical connector is deployed for use, the means for securing the rigid body able to secure the body to the support structure independently of the pair of abutting electronic modules; a first set of electrical contacts located at the first end of the body, the first set of electrical contacts designed, configured, and located to contact a corresponding second set of electrical contacts of the first electronic module when the electrical connector and the first and second electronic modules are deployed together for use; and a third set of electrical contacts located at the second end of the body, the third set of electrical contacts designed, configured, and located to contact a corresponding fourth set of electrical contacts of the second electronic module when the electrical connector and the first and second electronic modules are deployed together for use.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

General Description

Figure 1A:
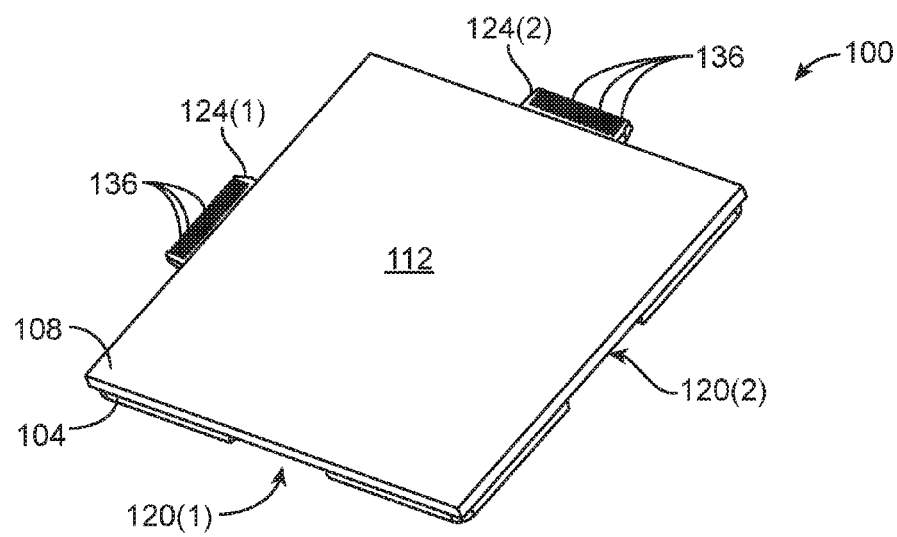
FIG. 1A is an isometric view of an exemplary display tile made in accordance with the present disclosure, showing the front face of the tile and two connector biscuits engaged with the two recessed receptacles.

In some aspects, the present disclosure is directed to modular electronic systems composed of a plurality of discrete electronic modules, such as a plurality of discrete display tiles and/or a plurality of discrete controller modules, that are operatively connected to one another using one or more connector biscuits that convey power and/or other signals, such as video signals, calibration signals, color control signals, etc., from one module to another module and/or from one or more controllers to one or more modules. Depending on the configurations of the electronic modules and connector biscuits, the use of connector biscuits can have a variety of benefits, a number of which are illustrated herein.

In some embodiments, the discrete electronic modules are display tiles for composing a display mosaic. Each such display tile can contain one or more light-emitting or non-light-emitting elements forming one or more, or many, pixels or portion(s) of one or more pixels, of a large composite display (e.g., a video display or other graphical display) or forming a portion of a larger composite non-graphical-type light-emitting mosaic. For the sake of convenience, a group of discrete electronic modules clustered together in working relationship is referred to herein as a "mosaic," with the discrete electronic modules being likened to the tiles of an artistic tile mosaic. However, for the purposes of this disclosure and the present claims, the use of the term "mosaic" and like terms should not be construed to include other limitations that the term may imply. Rather, its use herein and in the appended claims is limited to the discrete electronic modules, for example, display tiles, being deployed and connected to one another to form a working grouping of such modules, regardless of the shapes and/or character of the individual modules. Also for convenience, the term "illumination" is used herein and in the appended claims to distinguish display elements and display mosaics not functioning as video or other graphical display devices, such as general lighting and backlighting, from video and graphical display devices that display images electronically via image signals. Complementarily, the term "display" is used herein and in the appended claims to denote video and graphical display devices that display images electronically via image signals as well as illumination devices. Consequently, both graphical display devices and illumination display devices are species of the genus "display devices."

Examples of mosaicked displays that can be made using graphical display tiles of the present disclosure include, but are not limited to, electronic video displays, electronic scoreboards, electronic billboards, electronic signage, electronic collages, touchscreen displays (based on any suitable touchscreen technology), and any combination thereof. By "electronic collage" it is meant that each display tile or subset of multiple display tiles in the collage, displays a full image (e.g., a first photograph), while another display tile or other subsets of tiles displays a different full image (e.g., a second photograph different from the first photograph). Each display element of each graphical display tile may be any display element suitable for the graphical display at issue, including light-emitting elements (e.g., backlit, side-lit, emissive, etc.) and non-light-emitting elements (e.g., reflective). Examples of light-emitting elements include liquid-crystal display (LCD) devices, electronic-paper display devices, plasma display devices, light-emitting-diode (LED) display devices, incandescent display devices, and rear-projection display devices (such as display devices based on digital light processors (DLPs)), among others. Examples of non-light emitting elements include reflective displays, such as cholesteric LCD, electrophoretic displays, electrochromic displays, electrowetting, light refraction, interference, and/or diffraction displays, among others. Examples of illumination display mosaics include panels for photographic and cinematographic lighting, room-illumination, decorative illumination, and backlighting for fixed graphical displays. Each illumination display element of each such display tile may include one or more back-lighting devices, such as one or more LED panels, one or more edge-lighting devices, such as LED strips, one or more light-emitting-capacitor panels, and incandescent devices, among others. Fundamentally, there is no limitation on the technology(ies) of the display element(s) that can be included in a display tile of the present disclosure other than that it/they can be implemented in tile form.

In some embodiments, the discrete electronic modules are designed and configured to be attached to a suitable support structure, which may include a flat, curved, or otherwise shaped substrate, lattice-style grid, or other structure, using any of a variety of attachment means, such as magnetic attraction, adhesive bonding, or mechanical fastening, among others, and any suitable combination thereof. It should be appreciated that fundamentally there is no limitation on the support structure. For example, it can be a wall, ceiling, floor, or other component of a building or other fixed or moving habitable structure (e.g., ship, aircraft, dirigible, etc.), or it can be a commodity article of manufacture (e.g., refrigerator) or a custom-built structure built specifically for supporting the discrete electronic modules at issue, among many others that are too numerous to mention. In some embodiments, the support structure is composed of sheet stock comprising a non-magnetized ferromagnetic material (e.g., steel), to which the electronic modules are attached by magnetic attraction of at least some of the discrete electronic modules to the ferromagnetic support structure. This can be accomplished, for example, by providing some or all of the discrete electronic modules with one or more permanent magnets that attract such outfitted modules to the non-magnetized ferromagnetic support structure. In some embodiments, the support structure can be composed at least partially of one or more magnetized ferromagnetic materials, and some or all of the discrete electronic modules may each contain non-magnetized ferromagnetic material for attracting such outfitted modules to the magnetized support structure. As noted above, while magnetic attraction can be used for attaching the discrete electronic modules to a support structure, other attachment means can be used. Examples of other attachment means include adhesive strips, hook-and-loop fasteners, double-sided tape, push-snap-button mechanisms, and snap-clips, among others.

In some aspects, the present disclosure is directed to discrete electronic modules each having at least one peripheral edge designed and configured to abut or confront a like-shaped peripheral edge of another electronic module. The abutting/confronting edges of the electronic modules each include at least one recessed receptacle designed and configured to receive a connector biscuit that operatively connects together the abutting/confronting electronic modules and/or operatively connects electronic modules with control/power electronics. In addition, connector biscuits can also be designed and configured to aid in properly aligning the electronic modules with one another. In some embodiments, each electronic module is a display tile that can be configured, for example, for either a graphical display mosaic or an illumination display mosaic, as desired. In some instantiations, such display tiles can be of any desired size and shape, as long as peripheral edges desired to abut with one another are suitably shaped for conformal abutment/confrontment with one another. Shapes can include rectangular (e.g., square), hexagonal, triangular, stair-step, wavy, zigzag, etc.—virtually any shape(s) that can conformally abut/confront one another. In some instantiations, all of the display tiles for a particular application can be of the same size, while in other instantiations they can be of differing sizes. In some instantiations, the display devices of all of the display tiles can be the same, or they can differ at a designer's will.

In some embodiments, as few as one peripheral edge per display tile may be provided with one or more recessed receptacles each for receiving a portion of a corresponding connector biscuit, while in other embodiments, two, three, etc., or all peripheral edges may each have one or more recessed receptacles each for receiving a portion of a corresponding connector biscuit. It is noted that utilizing connector biscuits of the present disclosure means that only recessed receptacles need to be provided on the discrete electronic modules, and this can lead to display tiles (or other discrete electrical modules) having peripheral edges that are smooth and/or free of any projections, which makes for easy handling, packing, and shipping, as well as allowing for simple installation and removal without the need to disturb adjacent modules. It is also noted that for display tiles that are rotationally symmetric, such as square, and have the same numbers of recessed receptacles on all peripheral edges, the tiles may be configured so that they can be installed in any particular mosaic in any rotational orientation. As will be seen from examples illustrated in the attached drawings and described below, a recessed receptacle of the present disclosure need not necessarily be bounded by parts of the corresponding discrete electronic module on all sides. For example and as illustrated in the accompanying drawings, a recessed receptacle of the present disclosure can be defined by a recess formed in a back face of a discrete electronic module at a peripheral edge of the electronic module.

As mentioned, connector biscuits of the present disclosure can be used to operatively connect together abutting/confronting electronic modules and/or to operatively connect such modules together and/or to control/power electronics using any suitable communications/power transmission modes. Examples of communications modes include wired modes, such as analog and digital (e.g., serial or parallel) modes, and wireless modes, such as optical, radio-frequency (RF), and microwave modes. Examples of power transmission modes include wired and wireless modes, with an example of the latter being magnetic induction power transmission. Depending upon the mode(s) involved, each connector biscuit will include for each mode one or more "interface points" that interface with corresponding respective operationally matched interface points of the recessed receptacles of the electronic modules. Examples of operationally matched interface points include electrical contacts for wired modes, optical emitters and corresponding optical detectors for optical modes, RF transmitters and receivers for RF modes, microwave transmitters and receivers for microwave modes, and electromagnets and induction coils for magnetic induction modes, among others. Those skilled in the art will readily understand how to implement operationally matched interface points on connector biscuits and corresponding recessed receptacles for any chosen communications and/or power transmission mode.

In some embodiments and relative to the operation of the electronic modules at issue, each connector biscuit may function as a passive pass-through device, passing control and/or power signals from one electronic module to another electronic module uni-directionally or bi-directionally depending upon a particular design. In some embodiments, each connector biscuit may function as an active device, for example, via onboard electronics designed and configured to provide the desired functionality(ies). Examples of active functionalities that a connector biscuit of the present disclosure may provide include, but are not limited to, signal processing (e.g., conditioning, conversion, amplification, etc.), signal routing, power conversion (e.g., stepping voltage/current) and power distribution, communications with offboard controllers, communications with other connector biscuits, and any combination thereof. In some embodiments of active connector biscuits, all connector biscuits may have the same functionality, whereas in other embodiments one or some, but fewer than all, connector biscuits may have enhanced functionality relative to other connector biscuits. For example, one or more enhanced connector biscuits may act as a master or otherwise functionally controlling connector biscuit, whereas the non-enhanced connector biscuits may act as slaves or otherwise functionally controlled connector biscuit.

As noted above, in addition to operatively connecting together abutting electronic modules, the connector biscuits and corresponding respective recessed receptacles may be designed and configured to assist in aligning the abutting electronic modules relative to one another. This can be useful, for example, when the electronic modules are mounted to a support structure in a way that allows the modules to be easily moved relative to the support structure, such as when the modules are magnetically engaged with the support structure. The alignment at issue between abutting electronic modules may be "edge" alignment that can be changed by sliding one abutting peripheral edge relative to the other abutting edges, "face" alignment that can be changed by moving the planes of the faces of the electronic modules at the abutting peripheral edges closer together or farther apart from one another, gap setting that controls the spacing, or gap, if any, between confronting electronic modules, or any combination thereof. When two identical square electronic modules are mounted to a planar support structure, perfect edge alignment may occur when the peripheral edges of the electronic modules perpendicular to the abutting peripheral edges on either side of the abutment are flush with one another, and perfect face alignment may occur when the faces of the electronic module are flush with one another along the abutting peripheral edges.

Alignment functionality of a connector biscuit of the present disclosure may be effected by shaping and sizing the interiors of the recessed receptacles and the corresponding portions of the electrical connector biscuit received therein to have a snug conformal fit in either or both of the requisite directions to provide the corresponding face and/or edge alignment functionality. A detailed example of providing such shaping and sizing is illustrated in the accompanying drawings and described below. The receptacle-engaging portions of a connector biscuit of the present disclosure and corresponding recessed receptacles may be provided with tapered/angled surfaces to assist a user in inserting the connector biscuit into the receptacle and effecting the alignment functionality.

In some embodiments, each connector biscuit and corresponding pair of recessed receptacles are designed and configured so that, when the connector biscuit is fully engaged with the corresponding recessed receptacles, the connector biscuit is completely hidden from view by the corresponding peripheral edges of the electronic modules being butted tightly against one another. However, in other embodiments the depths (along the biscuit insertion axes) and/or configurations of the recessed receptacles and the length (along the biscuit insertion axis) and/or configuration of connector biscuit can be precisely selected to maintain any desired gap between confronting peripheral edges of the discrete electronic modules. For example, if a particular application requires a consistent 5 mm gap between all immediately adjacent discrete electronic modules, then the recessed receptacles and the connector biscuit can be sized and/or shaped to provide that gap.

In this connection, it is noted that if relatively large spacing between adjacent electronic modules is desired, the system can be provided with connection extenders that allow users to join together two connector biscuits to provide an extension assembly having a length that is greater than the length of a single connector biscuit. Each such connection extender may have its own interface point(s) (e.g., electrical contacts, optical interface, RF interface, microwave interface, magnetic interface, etc., and any combination thereof) that interface with corresponding interface point(s) on the two connector biscuits being joined by the connection extender. These interface points and any corresponding interconnecting conductor(s) would simply act as one or more pass-throughs for the signal(s) flowing through the biscuits from/to the discrete electronic modules being connected together by the extension assembly. In some embodiments, the connection extender may have two recessed receptacles on opposing ends for respectively receiving the two connector biscuits. In the context of the exemplary recessed receptacles of the accompanying drawings, a corresponding connection extender might look like a double wishbone when viewed from the backside of the connection extender.

Depending on the number of signals that a connector biscuit of the present disclosure needs to carry from one discrete electronic module to another and/or the nature of the communications interface (e.g., electrical, optical, RF, microwave, magnetic, etc.), the connector biscuit may include one or more interface points on each of the end portions that engage a corresponding recessed receptacle on one of the electronic modules. In some embodiments in which the interface points are electrical contacts, each electrical contact is designed and configured to contactingly engage a corresponding electrical contact of one of the recessed receptacles. The electrical contacts on the connector biscuit may be of any type suitable for effecting positive contact with the corresponding electrical contacts of the recessed receptacles. For example, if the electrical contacts of the recessed receptacles are of the planar type, the electrical contacts on the electrical connector biscuit may be of the biased type, such as a cantilevered spring type, a biased pin type ("pogo pin"), an arched spring type ("leaf spring"), among others known in the art. Those skilled in the art will readily appreciate that the contact types can be reversed, with the planar contacts being on the electrical connector biscuit and the biased contacts being part of the recessed receptacle.

When planar-type electrical contacts are used for interface points, they can be in any suitable location and orientation. For example, the planar electrical contact may be either parallel or perpendicular to the biscuit insertion axis along which an electrical connector biscuit is inserted into a recessed receptacle. For the former, the engagement of the corresponding biased-type contacts includes sliding engagement, and, for the latter, the engagement of the corresponding biased-type contacts includes compressive engagement. In some embodiments, it can be desirable to orient the planar electrical contacts parallel, or largely parallel, to the biscuit insertion axis to avoid the biasing of biased contacts pushing the discrete electronic modules away from one another, as could potentially occur with planar contacts oriented perpendicularly to the insertion axis. As those skilled in the art will appreciate, orienting planar contact parallel to the biscuit insertion axis and using bias-type contacts can result in the biasing of bias-type contacts holding the connector biscuit in place. Other types of electrical contacts, such as pins and blades, can additionally or alternatively be used. It is noted that electrical contacts can be provided in sufficient number such that there are one or more contacts for the same connection. With extra/redundant electrical contacts, current can be higher and/or data frequency can be increased.

In some embodiments, some or all functional interface points on one end of a connector biscuit of the present disclosure may be in operative communication with at least one interface point on the other end of the connector biscuit. Operative communication may include direct communication, for example, via electrical or optical conductors, and/or indirect communication, such as when connector biscuit contains electronic circuitry for modifying one or more signals from one electronic module before providing the modified signal(s) to another electronic module and/or for generating one or more new signals from one or more signals from one module for providing to another module, among others. In some embodiments, some or all functional interface points on a connector biscuit may not be of the pass-through type, with their signal(s) not originating from a connected electronic module but from one or more signals received wirelessly from a remote source. Examples of signals that a connector biscuit of the present disclosure may carry from one electronic module to another or provide to an electronic module in a non-pass-through manner include power signals, control signals, clock signals, and data signals, among others, and any combination thereof.

In embodiments in which the electronic modules are mounted on a ferromagnetic substrate by magnetic attraction, each connector biscuit may include one or more magnets for attracting the connector biscuit to a non-magnetized substrate or, alternatively and when the ferromagnetic support material is magnetized, may include non-magnetized ferromagnetic material so that the connector biscuit is attracted to the substrate. In addition, when such a magnetic feature is used for a connector biscuit of the present disclosure, the magnetic attraction toward the support substrate can be leveraged, if needed, to hold electrical contacts, if any, of the connector biscuit and recessed receptacles firmly in contact with one another. In this scenario, the electrical contacts on the connector biscuit are located on a face of the biscuit connector that face the ferromagnetic support substrate, and the corresponding electrical contacts on the discrete electronic modules being connected by the biscuit are located on faces of the recessed receptacles that face away from the ferromagnetic support substrate. An example of this arrangement is illustrated in some of the appended figures.

In some embodiments in which the modular electronic system includes discrete display tiles forming a multi-tile composite display, or mosaic, and the multi-tile display is used in a finished room of a building, such as on a wall or ceiling, the modular electronic system may include one or more power sources and one or more other components, such as display controller(s) and/or data source(s), operatively coupled to one or more of the discrete display tiles of the multi-tile display. For example, each of these components may be located within a cavity of finishing or decorative trim, such as a cavity of a decorative baseboard, a cavity of chair rail, or a cavity of decorative crown moulding, or any combination thereof, among others. In some embodiments, the trim may be composed of multiple components. For example, the electronics-containing trim may include a base that attaches to the wall, floor, and/or ceiling at issue, a heat sink that removably attaches to the base and that at least partially forms the electronics-containing cavity(ies), and a cover that removably attaches to the base and/or heat sink to provide the assembly with a finished look. Such a cover may be painted or otherwise finished as desired, for example, to match existing conventional trim. In some embodiments, the base may be eliminated and/or the cover may be integrated with or permanently attached to the heat sink. In some embodiments, one or more of discrete display tiles can be operatively connected to the electronics in such a trim assembly via one or more connector biscuits of the present disclosure. In other embodiments, electrical connections can be made in any other suitable manner. In yet other embodiments, other forms of communications, such as RF, microwave, or optical, may be used, thereby eliminating physical connections between the discrete display tiles and the corresponding electronics.

As noted above, the accompanying drawings illustrate exemplary embodiments of electronic modules, connector biscuits, electronic module assemblies and sub-assemblies, and electronics-concealing finish trim. These examples should not be considered limiting in any way, as they are provided primarily to present visual examples of at least some of the features and aspects described above. In addition, where a feature or aspect of any of the embodiments described below is not particularly addressed, the general description, including variations and alternatives, of the description of the corresponding feature or aspect above shall apply to that feature or aspect to the extent that it is not contrary to the explicit description provided below.

Exemplary Embodiments

Figure 1B:
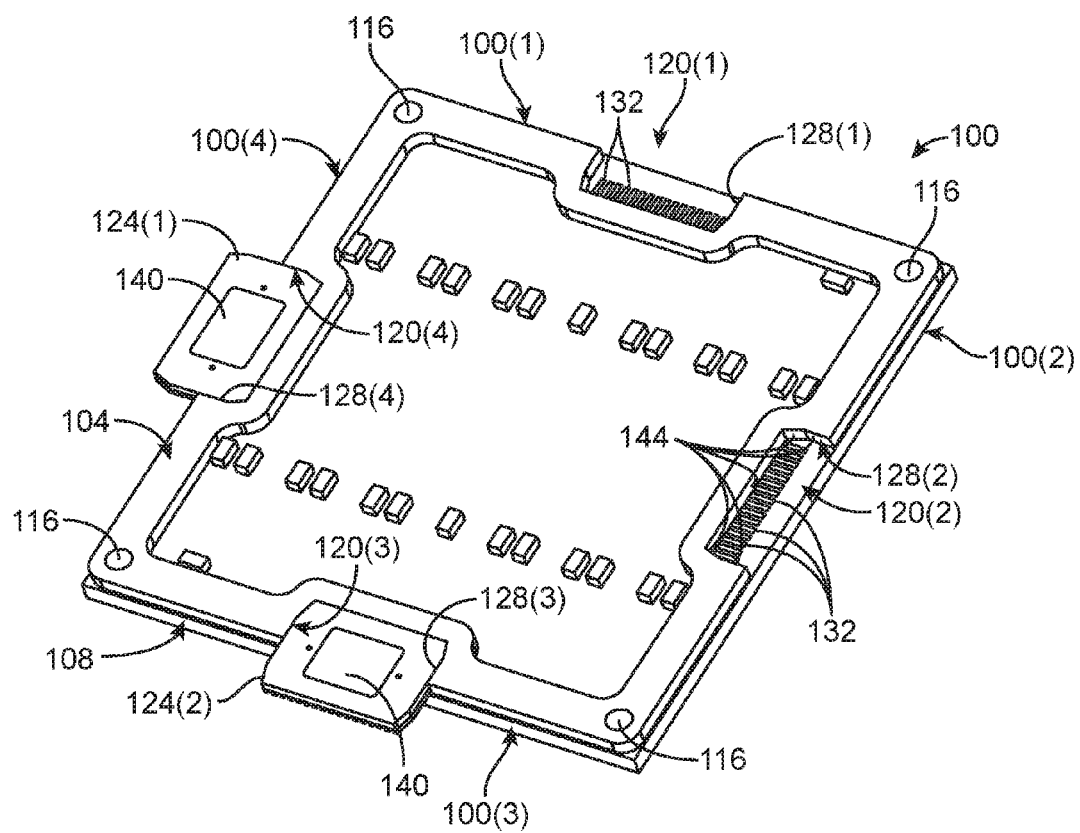
FIG. 1B is an enlarged isometric view of the display tile of FIG. 1A, showing the rear face of the tile and the two connector biscuits engaged with the two recessed receptacles.

Referring now to the drawings, FIGS. 1A and 1B illustrate an exemplary discrete electronic module, here a display tile 100, made in accordance with aspects of the present invention. In this example, display tile 100 includes a backing portion 104 and an active portion 108. Backing portion 104 in this example is made of a material having a relatively high thermal conductivity to allow it to function as a heat sink for active portion 108. Active portion 108 in this example comprises a flat-panel graphical display device that makes display tile 100 an active component of a larger composite video display (not shown). Such display device may be based on any suitable display technology, such as any of the display technologies mentioned above in the General Description section. In one exemplary but non-limiting instantiation, the front face of the display tile is 150 mm×150 mm.

FIG. 1A primarily shows the front face 112 of display tile 100, which is the display face that a viewer sees when viewing the composite video display of which display tile 100 would be part of when deployed. In this example, display tile 100 is a magnetically mountable tile, and the magnetic mounting is effected by a set of permanent magnets 116 fixed to back portion 104 (FIG. 1B). As those skilled in the art will readily appreciate, any of a variety of discrete permanent magnets can be used for permanent magnets 116. Not shown in FIGS. 1A and 1B but able to be readily envisioned, is a ferromagnetic support structure, such as a non-magnetized ferromagnetic metal sheet or metal lattice, to which permanent magnets 116 are attracted when the display tile is deployed in a composite video display.

FIG. 1B shows that in this example display tile 100 has four recessed receptacles 120(1) to 120(4), one centered on each of the four peripheral edges 100(1) to 100(4) of the tile, two of which shown as being engaged by a pair of identical connector biscuits 124(1) and 124(2), which are the same as or similar to connector biscuit 300 depicted in FIGS. 3A and 3B and described below. In the embodiment shown in FIG. 1B, each recessed receptacle 120(1) to 120(4) is essentially formed by a recess 128(1) to 128(4) in display tile 100, which can be formed by a notch in backing portion 104 along a corresponding peripheral edge of the display tile if the depth of the recess is equal to or greater than the thickness of the backing portion.

As seen in FIG. 1B, in this example, each recessed receptacle 120(1) to 120(4) includes 16 planar electrical contacts 132 (only a few labeled to avoid clutter and only visible for receptacles 120(1) and 120(2)) on active portion 108 of display tile 100, and as seen in FIG. 1A, each connector biscuit 124(1) and 124(2) includes 16 corresponding electrical contacts 136 (only a few labeled to avoid clutter), here, of the leaf-spring type, that engage the 16 planar contacts when the connector biscuit is fully engaged with the corresponding recessed receptacle. Those skilled in the art will readily appreciate that any other suitable number of electrical contacts may be provided to active portion 108 and connector biscuits 124(1) and 124(2) in accordance with a particular design. It is noted that electrical contacts 132 need not be on active portion 108. For example, if the depth of each recessed receptacle 120(1) to 120(4) is less than the thickness of backing portion 104, then electrical contacts 132 may be provided on the backing portion. As another example, if display tile 100 were to have a construction different from the construction illustrated, such as by including another layer or other structure, electrical contacts 132 could be provided on such other layer or other structure. Planar contacts 132 and the corresponding connector biscuits, such as connector biscuits 124(1) and 124(2), allow display tile 100 to communicate with another display tile (not shown, but see FIGS. 2A and 2B, or other component (not shown) of an overall composite display system, such as a video controller, data source, and/or power source, among others. In the illustrated embodiment and as seen in FIG. 1B, each connector biscuit 124(1) and 124(2) includes a permanent magnet 140 for magnetically attracting that biscuit to a non-magnetized ferromagnetic support structure, such as the metal sheet or metal lattice mentioned above.

Figure 2A:
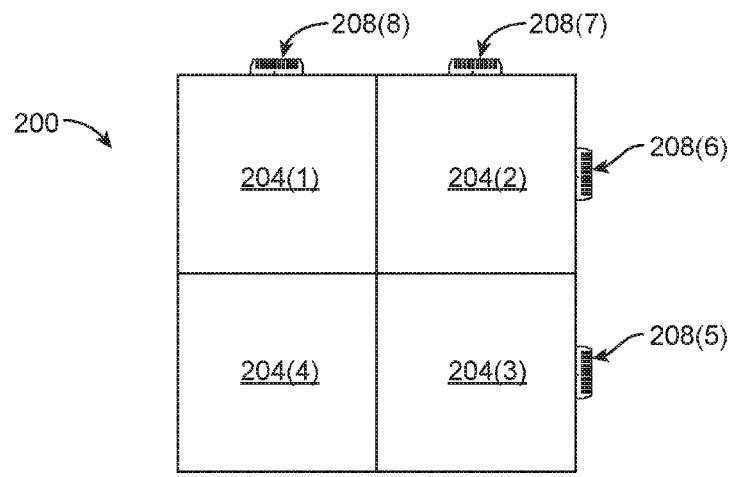
FIG. 2A is a front elevational view of an exemplary assembly of four display tiles operatively connected together via connector biscuits.
Figure 2B:
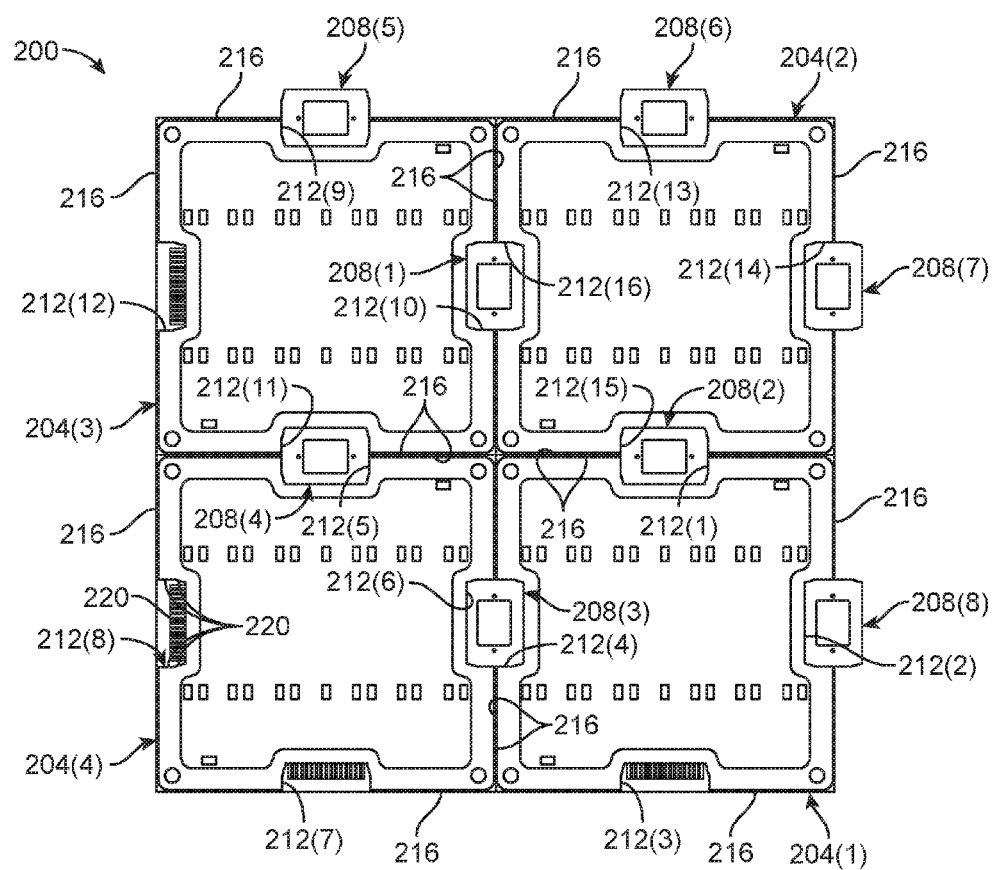
FIG. 2B is an enlarged rear-elevational view of the assembly of FIG. 2A, showing the four display tiles operatively connected together via four connector biscuits.

FIGS. 2A and 2B illustrate a display mosaic, here a portion 200 of a larger composite display, composed of four display tiles 204(1) to 204(4), each physically identical to display tile 100 of FIGS. 1A and 1B, electrically connected together via four connector biscuits 208(1) to 208(4) that are each identical to connector biscuits 124(1) and 124(2) shown in FIGS. 1A and 1B. In the example of FIGS. 2A and 2B, the sizes and shapes of connector biscuits 208(1) to 208(4) and recessed receptacles 212(1) to 212(16) are carefully selected and formed to create very tight fits that minimize the amount of play between abutting display tiles, such as tiles 204(1) to 204(4), particularly in a direction parallel to the abutting peripheral edges 216 (only a few labeled to avoid clutter). This allows the display tiles, such as tiles 204(1) to 204(4) to be precisely aligned with one another, which can be critical for providing a high-quality composite display, where even small offsets can visually detract from the images displayed on the display. FIGS. 2A and 2B also show four additional connector biscuits 208(5) to 208(8) engaged with three of display tiles, here, display tiles 204(1), 204(2), and 204(4), each waiting to be operatively (here, electrically) connected to another display tile (not shown) or other component (not shown) of an overall video display system, such as a video controller, data source, and/or power source, among others. It is noted that while each display tile 204(1) to 204(4) is illustrated as having a single recessed receptacle 212(1) to 212(16) on each peripheral edge 216, as noted above, each peripheral edge may be provided with two or more recessed receptacles as needed to suit a particular design.

Figure 3A:
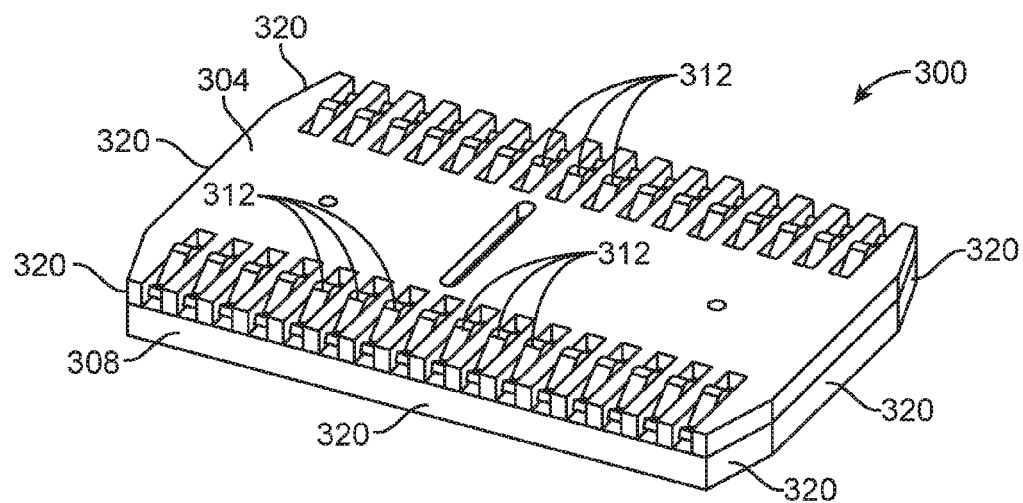
FIG. 3A is an isometric view of a connector biscuit that can be used as any of the connector biscuits of FIGS. 1A to 2B, showing its front face.
Figure 3B:
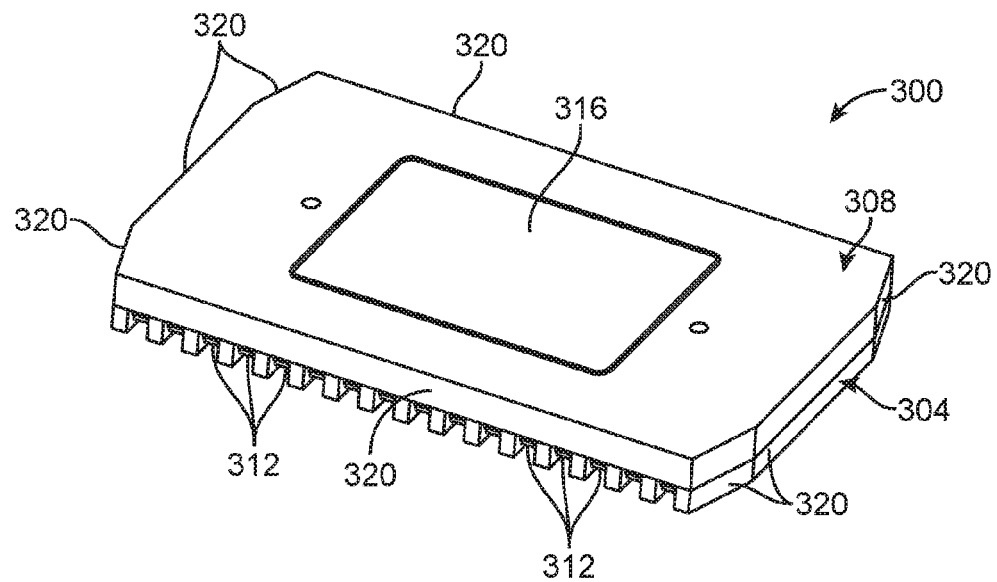
FIG. 3B is an isometric view of the connector biscuit of FIG. 3A, showing its rear face.

FIGS. 3A and 3B illustrate features of a connector biscuit 300 that is the same as or similar to each of connector biscuits 124(1) and 124(2) of FIGS. 1A and 1B and connector biscuits 208(1) to 208(8) of FIGS. 2A and 2B. As seen in FIG. 3A, in this embodiment connector biscuit 300 includes front and back housing components 304 and 308 secured together in a manner that sandwiches the electrical conductor(s) that provide the 16 leaf-spring-type electrical contacts 312 (only a few labeled to avoid clutter) on each end of the biscuit. As noted above, the overall size, shape, and configuration of connector biscuit 300 may be selected and formed to snugly engage corresponding recessed receptacles, such as recessed receptacles 120(1) to 120(4) of FIGS. 1A and 1B and recessed receptacles 212(1) to 212(16) of FIGS. 2A and 2B, on the electronic modules at issue and, if desired, any additional components of an overall mosaicked system of such modules. In some embodiments, each pair of corresponding electrical contacts 312 on opposing ends of connector biscuit 300 may be in electrical communication with one another but electrically insulated from each other pair of electrical contacts to provide 16 separate signal paths. In other embodiments, some or all of the 16 electrical contacts 312 on one end of connector biscuit 300 may be electrically connected in one or more groups to the 16 electrical contacts on the other end of the biscuit, depending on the design requirements of the overall mosaicked system. In other embodiments, examples of which are described below in connection with FIG. 8, various ones or all of the interface points (e.g., electrical contacts 312) may be connected to one or more electronic components located onboard the connector biscuit, such as, but not limited to, microprocessor(s), signal processor(s), wireless communications device(s), among others, and any combination thereof. FIG. 3B illustrates this embodiment of connector biscuit 300 as including a magnet 316 secured to back housing component 308 that confronts a support structure (not shown) when the connector biscuit is deployed for use.

In the embodiment shown, connector biscuit 300 includes lateral surfaces, such as lateral surfaces 320, that are designed and configured to confront like surfaces within a recessed receptacle, such as like surfaces 144 and 220, of FIGS. 1B and 2B, respectively, with minimal or no gaps therebetween, so as to effect a precision fit between the connector biscuit and that electrical receptacle. In this manner and when used with abutting discrete electronic modules, such as display tiles (e.g., display tiles 100, 204(1) to 204(4), 412(1) to 412(9), 704(1) to 704(4), and 724(1) to 724(4) of FIGS. 1A, 1B, 2A, 2B, 4, and 7A-7D), full engagement of the connector biscuit 300 with the mating receptacle can ensure proper edge alignment and/or gap between the electronic modules connected together by the connector biscuit.

It is noted that while connector biscuit 300 is illustrated as having two housing components 304 and 308, in other embodiments, it may have another construction, such as a monolithically molded construction or construction having more, fewer, and/or differing types of housing construction. In other embodiments, magnet 316 may be eliminated or replaced by another type of fastening means, such as an adhesive-based fastening means, hook-and-loop-based fastening means, or snap-fit mechanical connector, among others. Furthermore, in other embodiments, electrical contacts 312 may be replaced with another type of electrical contact, such as planar contacts, socket contacts, and pin contacts, among others, and/or may be provided in any suitable number, or may be replaced by another type of interface point, such as an optical interface point, an RF interface point, a microwave interface point, or magnetic interface point, among others. In addition, the specific shape of exemplary connector biscuit 300 is merely exemplary and non-limiting, as many other shapes are possible.

Figure 4:
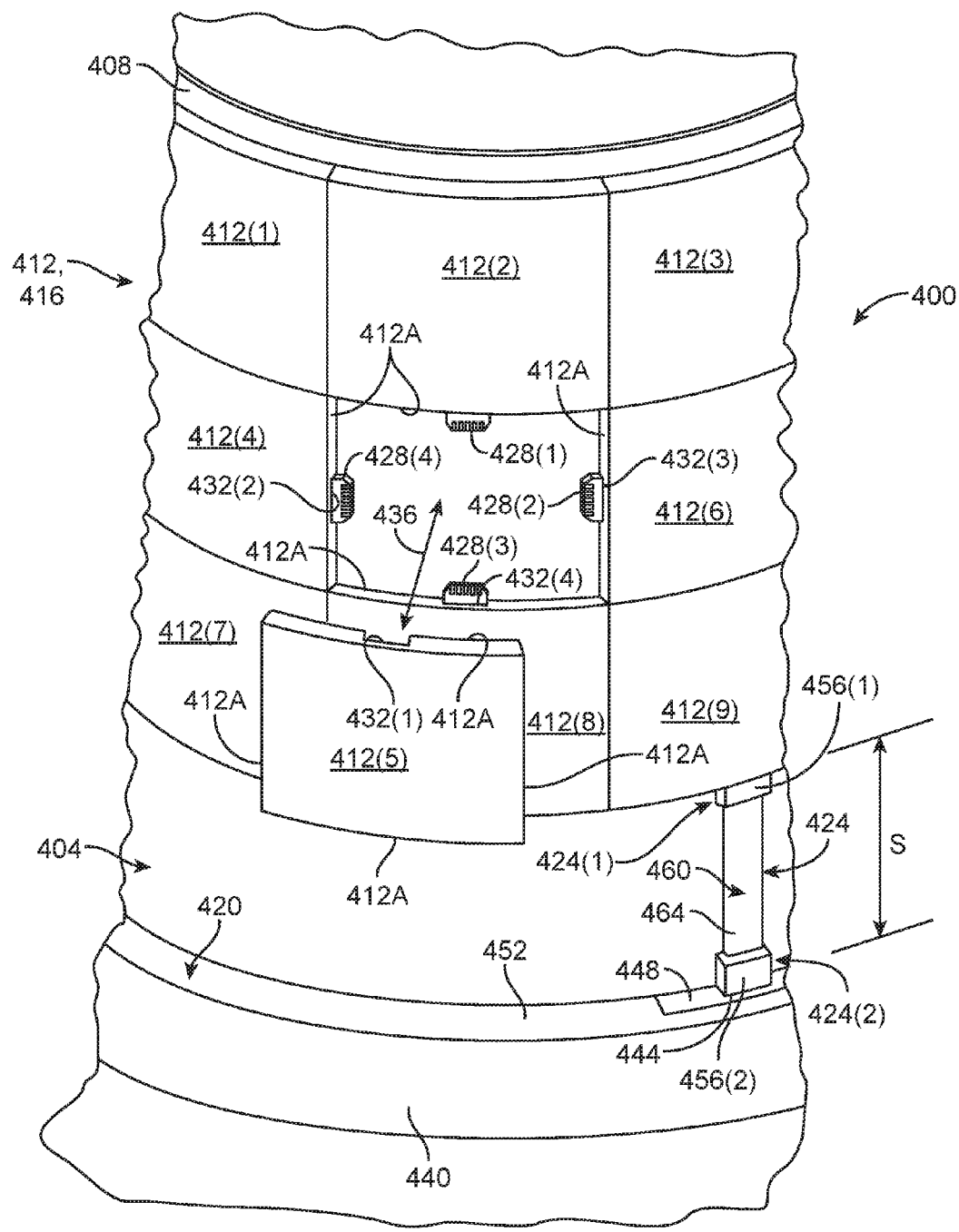
FIG. 4 is a partial isometric view of an exemplary display mosaic system of the present invention, showing one of the display tiles disengaged from the mosaic to illustrate the ease of installing and removing an individual tile to and from the mosaic.

FIG. 4 illustrates a display mosaic system 400 that illustrates some important features and aspects of the present invention. In this example, display mosaic system 400 is applied to curved structure 404, such as a curved wall, a cylindrical building column, or freestanding curved pylon, among others. Display mosaic system 400 includes: 1) a curved, plate-type support structure 408; 2) a plurality of identical curved display tiles 412 (here, nine display tiles 412(1) to 412(9) are at least partially visible) magnetically attached to the support structure and electrically connected to one another to form a display mosaic 416; 3) a baseboard-style power/control system 420; and 4) a biscuit extender 424 electrically connecting the power/control system to the display mosaic. As used herein and in the appended claims, the term "power/control system" means power and/or control system to indicate that its function can range from providing only power to display mosaic 416, for example, if display tiles 412 are only simple light sources, to providing both power and one or more types of control signals to the display tiles. Examples of control signals include any sort of video-display control signals as well as simple color-control signals, such as when one or more of display tiles 412 is configured to controllably emit light of differing colors.

In the embodiment shown, support structure 408 is made of any one or more materials suitable for the manner in which display tiles 412 attach to the support structure. For example, if display tiles 412 attach to support structure 408 by magnetic attraction, the support structure may be a sheet of steel or other non-magnetized ferromagnetic material if the display tiles have magnets. If display tiles 412 attach to support structure 408 by other means, such as adhesive, hook-and-loop fasteners, or other mechanical fasteners, the support structure may be configured accordingly.

Each display tile 412 can be any type of display tile, depending on the nature of display mosaic 416. For example, display mosaic 416 may be a composite display acting as a single large display or as multiple smaller displays, with each smaller display composed of one or more of display tiles 412 acting as a group. As another example, display mosaic 416 may be an illumination mosaic acting as a single large illumination mosaic or as multiple smaller illumination mosaics, with each smaller mosaic composed of one or more of display tiles 412 acting as a group. In the spirit of the connector biscuits described above, such as connector biscuits 124(1), 124(2), 208(1) to 208(8), and 300 of FIGS. 1A to 3B and the connector biscuits described in the General Description section above, display tiles 412 are operatively connected together via connector biscuits 428, four of which are visible in FIG. 4 at elements 428(1) to 428(4). Each connector biscuit 428 may be generally the same as all others of the connector biscuits, with the exception that for this curved application, the biscuits may be provided in sets of differing curvatures to account for the curvature of curved structure 404 and the two orientations of the biscuits in the mosaic. For example, each of connector biscuits 428(1) and 428(3) and like situation biscuits not seen may have a curvature along its longitudinal axis, and each of connector biscuits 428(2) and 428(4) and like biscuits not seen may have a curvature perpendicular to its longitudinal axis. Other features and aspects of connector biscuits 428 may be the same as or similar to other features and aspects of other connector biscuits described herein.

Like exemplary display tiles 100 and 204(1) to 204(4) of FIGS. 1A to 2B, each of display tiles 412 in this example is rectangular in shape, but curved, and has four recessed receptacles 432, four of which are visible at elements 432(1) to 432(4), one on each of peripheral edge 412A (only a few labeled to avoid clutter) of that tile. Each recessed receptacle 432 may be curved in the appropriate direction to match the curvature of structure 404 and corresponding respective ones of connector biscuits 428. Each recessed receptacle 432 may be the same as or similar to any of recessed receptacles 120(1) to 120(4) and 212(1) to 212(16) of FIGS. 1A to 2B and described above in the General Description section. A benefit of the configurations of recessed receptacles 432 and corresponding connector biscuits 428 is that individual display tiles 412 can be removed and installed easily, for example using a suction-cup tool (not shown), without disturbing immediately adjacent display tiles. This is so because the recessed configuration of recessed receptacles 432 allows each display tile 412 to be engaged with its corresponding connector biscuits 428 by moving that display tile in a direction generally normal (accounting for any curvature of the support structure, here, support structure 408) to the face of the support structure, as illustrated by directional arrows 436. As such, for example, a failed or damaged one of display tiles 412 can be easily removed from completed display mosaic 416 and replaced and the display mosaic can be constructed or dismantled without regard to any particular order of installing or removing the display tiles.

Baseboard-style power/control system 420 includes a housing 440 that may be designed and configured to mimic the look and/or function of a conventional baseboard of a finished habitable space. It is noted that in other embodiments, housing may be designed and configured to mimic the look and/or function of other conventional trim, such as chair rail and crown moulding, among others. Housing 440 may house any or all of the power/control devices (not shown), for example, power supply(ies), video controller(s), and/or color controllers, among others, needed to make display mosaic 416 functional, depending on its nature. Power/control system 420 may include one or more recessed receptacles 444 designed and configured to receive a corresponding connector biscuit, here one of connector biscuits 428 having suitable curvature. In some embodiments, each recessed receptacle 444 provided may be movable along the length of housing 440, for example, within a predetermined range of movement, to allow an installer to align a desired one of recessed receptacle(s) 444 with a corresponding recessed receptacle 432 on one of display tiles to which power/control system 420 is to be connected. For example, this could be achieved by using flexible electrical conduits (not shown) within housing 440 to connect each recessed receptacle 444 to the electronics inside the housing and providing such conduits with sufficient length and room for movement. In addition, each such movable recessed receptacle 444 may be coupled to laterally movable housing closure 448 on either side of the electrical receptacle that over- or under-laps fixed housing closure 452 to close housing 440.

Biscuit extender 424 is used in this example to carry power/signals across the space, S, between display mosaic 416 and power/control system 420. That said, it is noted that in other embodiments, display mosaic 416 can be located so as to abut housing 440 of power/control system 420, in which case only one of connector biscuits 428 needs to be used. However, with space S present, two such connector biscuits 428 are used in conjunction with biscuit extender 424. Biscuit extender 424 has first and second ends 424(1) and 424(2) each having a corresponding recessed receptacle (hidden) that is identical to like ones of recessed receptacles 432 so that the same connector biscuits 428 can be used. Each electrical receptacle 432 can be contained in a suitable end housing 456(1) and 456(2) secured to an electrically conducting ribbon 460, which in this example contains 16 electrical conductors (not visible) corresponding to 16 electrical contacts (not shown) in each recessed receptacle. When support structure 408 comprises a non-magnetized ferromagnetic material, each end housing 456(1) and 456(2) may include one or more magnets (not shown) that attach that end housing to the support structure. In other embodiments, other attachment means, such as any of the attachment means described above, can be used to attach each end housing 456(1) and 456(2) to support structure 408. To keep conducting ribbon 460 flat against support structure 408 when the support structure includes a non-magnetized ferromagnetic material, the conducting ribbon may include a flat sheet magnet (not shown) or other type of magnet. In other embodiments, another type of attaching means can be used, such as adhesive, hook-and-loop fasteners, or other type of fastener. One or both of end housings 456(1) and 456(2) may be of a type that allows a user to cut conducting ribbon 460 to the needed length and then secure the end housing to conducting ribbon in a manner that electrically self-connects the electrical contacts (not shown) in the corresponding recessed receptacle to the electrical conductors within the conducting ribbon, such as using 16 contact blades (not shown) that pierce an insulation layer 464 of the conducting ribbon to make electrical contact with the electrical conductors.

Figure 5:
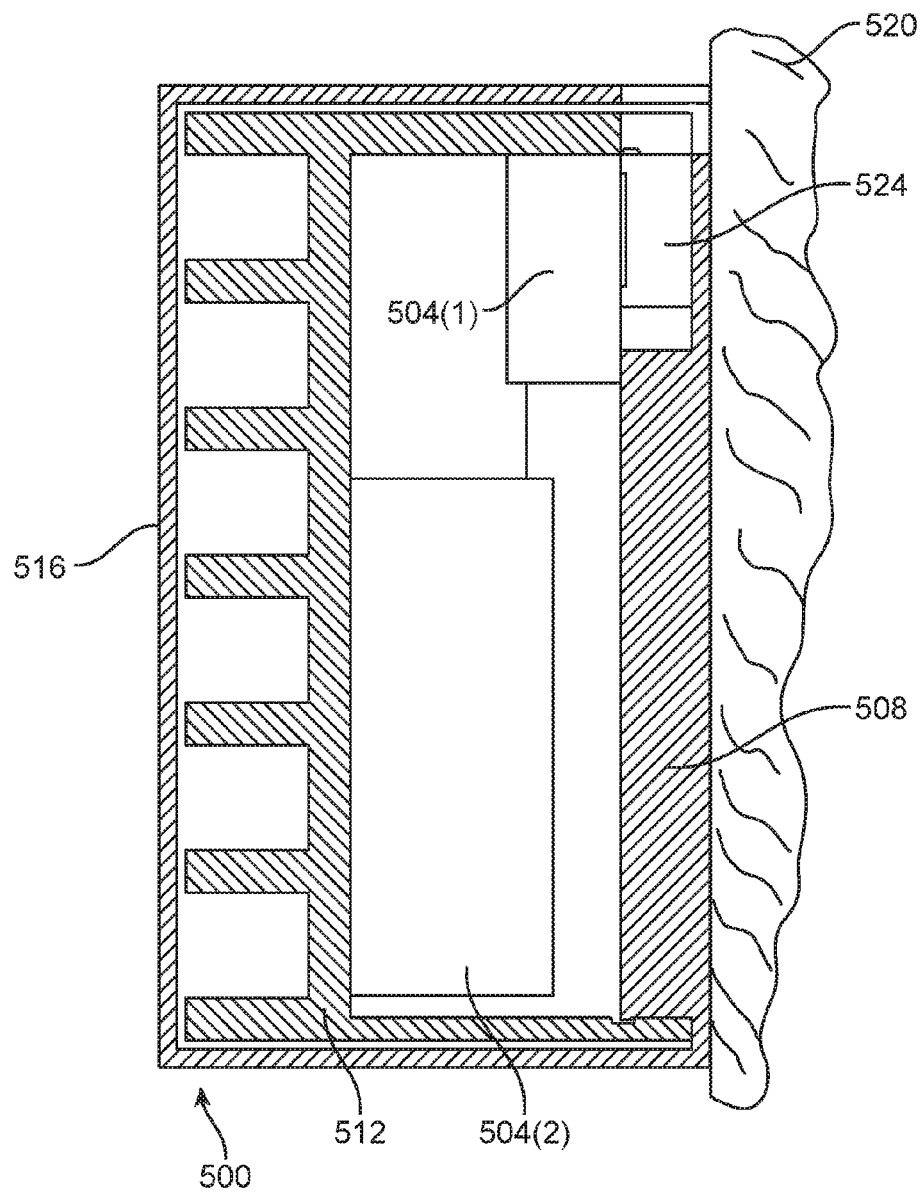
FIG. 5 is a transverse cross-sectional view/partial schematic view of an electronics-concealing finish trim assembly made in accordance with the present invention engaged with a wall.

FIG. 5 illustrates an exemplary electronics-concealing finish trim assembly 500 that can be used with display tiles and/or other discrete electronic modules of the present disclosure, such as any of display tiles 100, 204(1) to 204(4), and 412(1) to 412(9) of FIGS. 1A, 1B, 2A, 2B, and 4 (such as for baseboard-style power/control system 420 of FIG. 4), and the display tiles described in the General Description section above. A finish trim assembly of the present disclosure, such as the finish trim assembly 500 of FIG. 5, may be used to conceal any or all electronics components 504, such as electronic components 504(1) and 504(2), not located onboard the discrete electronic modules (not shown). Examples of such electronic components include, but are not limited to, power sources, display drivers, data sources, color controllers, etc., and any combination thereof. Fundamentally, there are no constraints on the type of electronic components that can be concealed within finish trim assembly 500. As seen in FIG. 5, finish trim assembly 500 may include a base 508, a heat sink 512, and a cover 516. Base 508 may be securable to a wall or other structure 520, with heat sink 512 being removably secured to base 508 and cover 516 being removably secured to the heat sink and/or base. In other embodiments, heat sink 512 may be thermally engaged with base 508 or integrated with the base to sink heat through support structure 520. In this example, base 508 includes one or more recessed receptacles 524 designed and configured to receive a corresponding connector biscuit (not shown), which may be the same as or similar to any of the connector biscuits shown and/or described herein. This allows one or more of the discrete electronic modules to be connected to finish trim assembly 500 and electronic component(s) 504 concealed therein without needing any different connectors. It is noted that finish trim assembly 500 shown in FIG. 5 is merely exemplary and that similar finish trim assemblies may be configured differently, such as without a base and/or with the heat sink rotated 180° so that the cover covers the cavity, among others. In addition, each recessed receptacle 524, if provided, may be provided in a different component, such as the heat sink. Those skilled in the art will readily understand the variety of ways that a finish trim assembly of the present disclosure can be executed.

In other embodiments, any or all electronics that may be concealed in a finish trim assembly, such as finish trim assembly 500 of FIG. 5, may be provided in another manner. For example, such electronics may be provided in one or more electronics modules that mount to the same support structure that supports the corresponding display tiles in abutting fashion to any one or more of the display tiles. In such embodiments, the electronics module(s) may each have a form factor that is the same or similar to the form factor of the individual display tiles, or, alternatively, the form factor may be different, such as a form factor that makes the electronics module(s) appear to form a perimeter frame member, for example, any one or more of a side frame member, bottom frame member, and a top frame member, for the corresponding mosaicked display. By virtue of the abutment of the electronics module(s) with one or more display tiles, any one or all of the electronics modules may operationally connect to the display tile(s) via one or more connector biscuits in the same manner that individual display tiles are operationally connected to one another.

Figure 6:
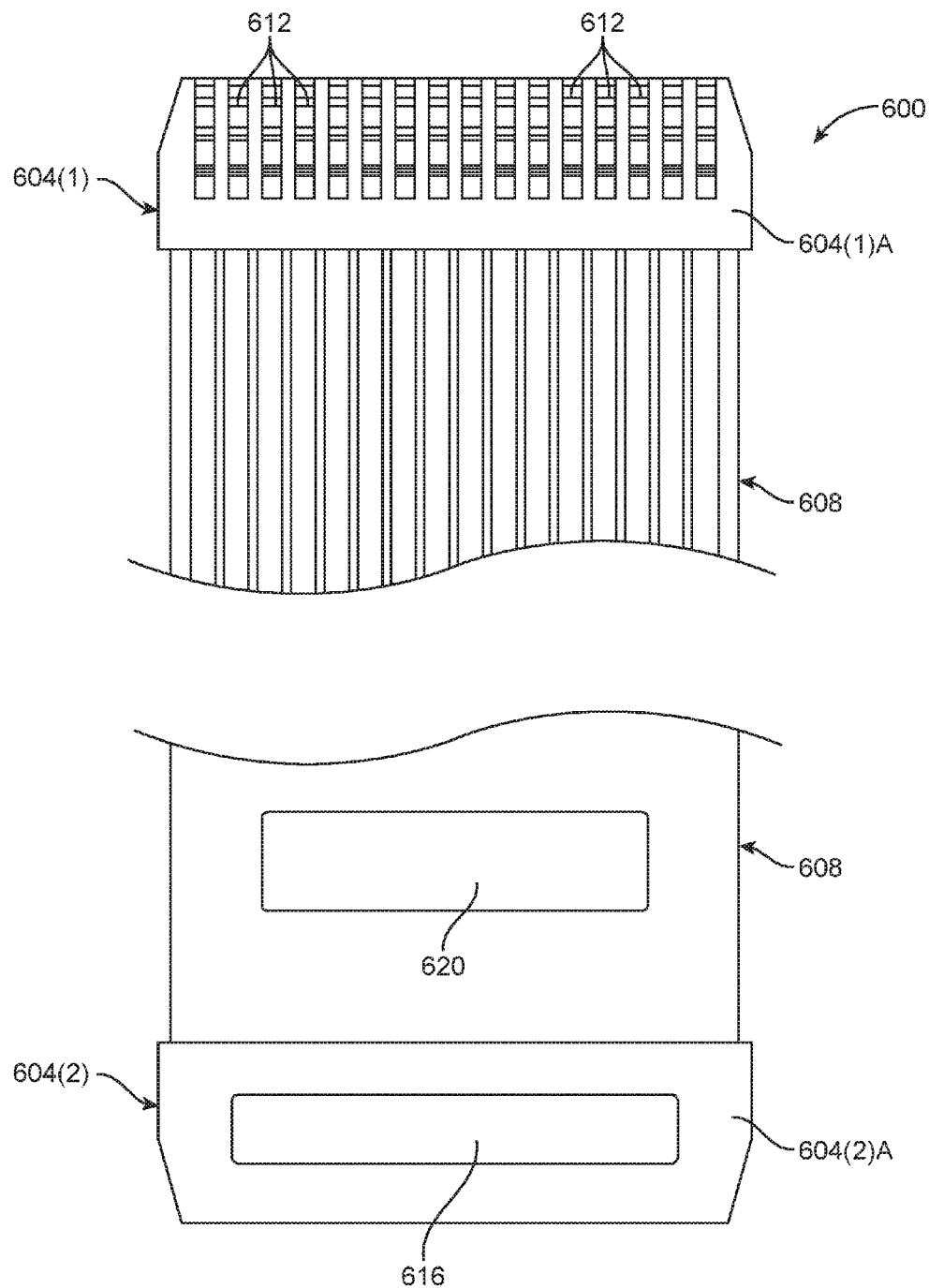
FIG. 6 is a view of an exemplary flexible electrical connector assembly of the present invention, showing one end of the connector flipped over to illustrate the front and back sides of the connector ends.

FIG. 6 illustrates a flexible electrical connector 600 that can be used, for example, in place of biscuit extender 424 of FIG. 4. Referring to FIG. 6, flexible electrical connector 600 includes identical first and second end connectors 604(1) and 604(2) electrically connected together via a conductive ribbon 608. In this example, each end connector 604(1) and 604(2) is identical to one half of connector biscuit 300 of FIGS. 3A and 3B in terms of number and style of electrical contacts 612 (only a few labeled to avoid clutter) or other interface point(s). With 16 electrical contacts 612 electrically insulated from one another, conductive ribbon 608 includes a corresponding set of 16 electrical conductors (not shown) electrically insulated from one another. Each end connector 604(1) and 604(2) may be considered to have a housing 604(1)A and 604(2)A that holds electrical contacts in place and contains the ends (not seen) of conductive ribbon 608 and the electrical connections therebetween. In a manner similar to biscuit extender 424 of FIG. 4, at least one of end connectors 604(1) and 604(2) may be of the sort that allows a user to cut conductive ribbon 608 to any desired length before securing the end connector to the conductive ribbon in a manner that completes the electrical connection between the electrical conductors inside the ribbon to electrical contacts 612. In the embodiment shown, which is for a mosaic system having a non-magnetized ferromagnetic support structure, each end connector 604(1) and 604(2) includes a permanent magnet 616 for holding flexible electrical connector 600 to the support structure. Conductive ribbon 608 may optionally include one or more permanent magnets 620 to assist holding the conductive ribbon flat to the support structure. As noted above, in other embodiments, permanent magnets 616 and 620 may be replaced by other fastening means, such as one part of hook-and-loop fasteners, adhesive patches, adhesive tape, mechanical fasteners, etc.

FIGS. 7A to 7D illustrate four different mosaicked displays 700A, 700B, 700C, and 700D, each made with either one or two types of display tiles, an oblong rectangular type and a stair type. Although not seen, abutting ones of the display tiles are electrically connected to, and may be at least partially aligned with, one another using connector biscuits, such as any of the connector biscuits 124(1), 124(2), 208(1) to 208(8), 300, and 428(1) to 428(4) shown in FIGS. 1A to 4 and described above in the General Description section. In each of exemplary mosaicked displays 700A, 700B, 700C, and 700D, the display tiles may be of a magnetic type and may be the same as or similar to the display tiles of FIGS. 1A to 2B, and the connector biscuits may be of a magnetic type the same as or similar to the connector biscuit of FIGS. 3A and 3B.

Figure 7A:
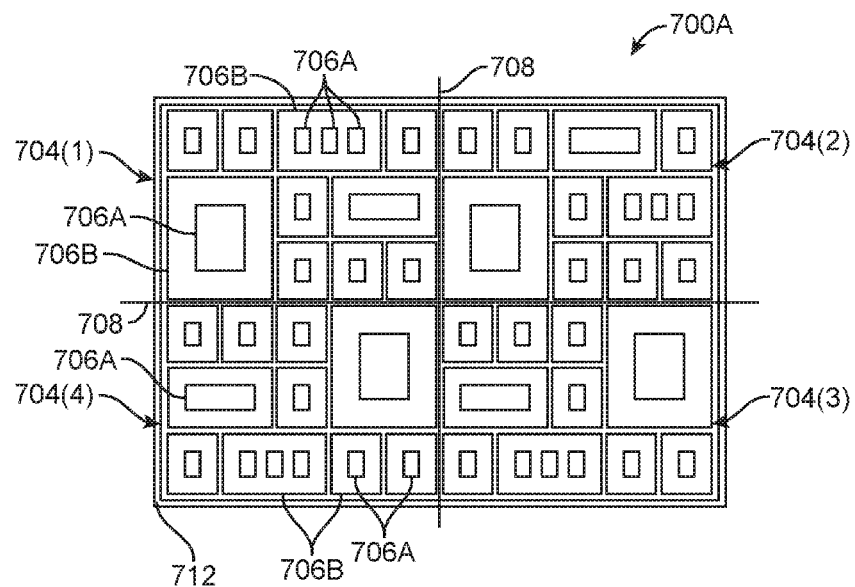
FIG. 7A is a partial diagrammatic/partial elevational view of four identical discrete rectangular electronic modules arranged on a wall and electrically interconnected together in a side-by-side and stacked configuration.

FIG. 7A shows four like oblong rectangular display tiles 704(1) to 704(4) arranged two-over-two, with the long sides horizontal, to provide mosaicked display 700A. The rectangular boxes, such as boxes 706A and 706B (only a few labeled to avoid clutter), in each display tile 704(1) to 704(4) represent electronic components, such as display drivers, power electronics, and communications systems, among others. Those skilled in the art will readily appreciate that these components typically lie behind the display face (not shown) of each of display tiles 704(1) to 704(4) and are shown to illustrate potential electronic complexity of the display tiles. Unlabeled like boxes throughout FIGS. 7A-7D illustrate like electronic components. As mentioned above, display tiles 704(1) to 704(4) are electrically connected together, and abutting/confronting edges (indicated by heavy lines 708) are aligned with one another, using connector biscuits (hidden), which may be the same or similar to any of the connector biscuits shown and/or described elsewhere in this disclosure. In this example, display tiles 704(1) to 704(4) and the interconnecting connector biscuits are attached to a support sheet 712 that may have the same shape as the outline of composite display. It is noted that support sheet 712 is shown as having a size slightly larger than the size of mosaicked display 700A for the sake of illustration. In some embodiments, the size of support sheet 712 may be the same as or smaller than the size of mosaicked display 700A for a "cleaner" look. In some embodiments, support sheet 712 may be a non-magnetized ferromagnetic sheet and display tiles 704(1) to 704(4) may be magnetically attached to the support structure, for example, in any of the manners described above. In some embodiments, the attachment may be effected by other means, such as adhesive bonding or mechanical fasteners, among others.

Figure 7B:
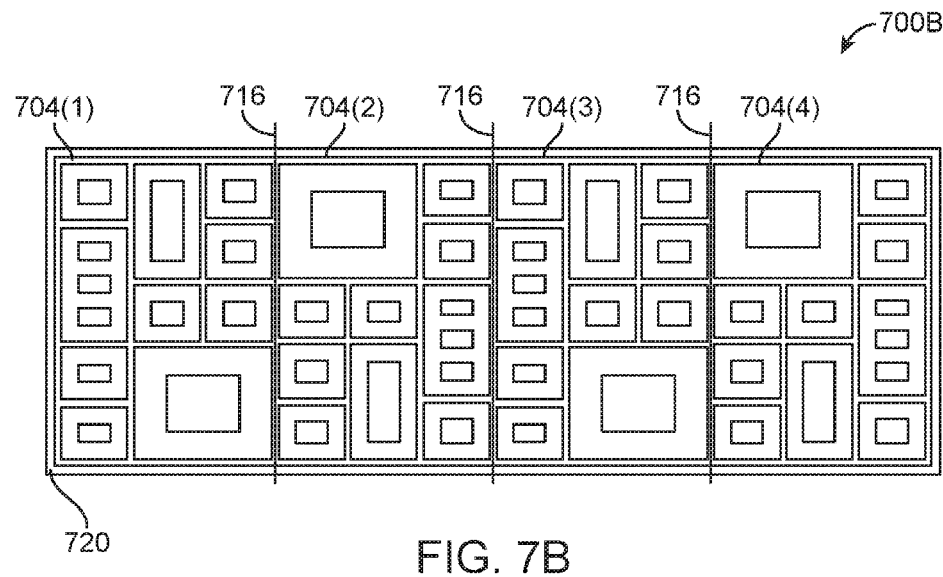
FIG. 7B is a partial diagrammatic/partial elevational view of four identical discrete rectangular electronic modules arranged on a wall and electrically interconnected together in a side-by-side configuration.

For the sake of illustration, FIG. 7B shows the same four display tiles 704(1) to 704(4) arranged side-by-side and oriented 90° relative to the orientations shown in FIG. 7A so as to provide a differently configured mosaicked display 700B. The configurations of FIGS. 7A and 7B can be readily achieved because of the presence of recessed receptacles (not seen) that are the same as or similar to recessed receptacles 120(1) to 120(4), 212(1) to 212(16), and 432 of FIGS. 1A, 1B, 2A, 2B, and 4 or other recessed receptacles described above, located symmetrically along the four peripheral edges of each of the like display tiles 704(1) to 704(4). As with mosaicked display 700A of FIG. 7A, abutting edges (indicated by heavy lines 716) of display tiles 704(1) to 704(4) in mosaicked display 700B of FIG. 7B are electrically connected to, and at least partially aligned with, one another using connector biscuits as described above. Other attributes and features of mosaicked display 700B may be the same as the corresponding attributes and features described above relative to mosaicked display 700A, and mosaicked display 700B may, for example, be magnetically attached to a like-shaped support structure 720.

Figure 7C:
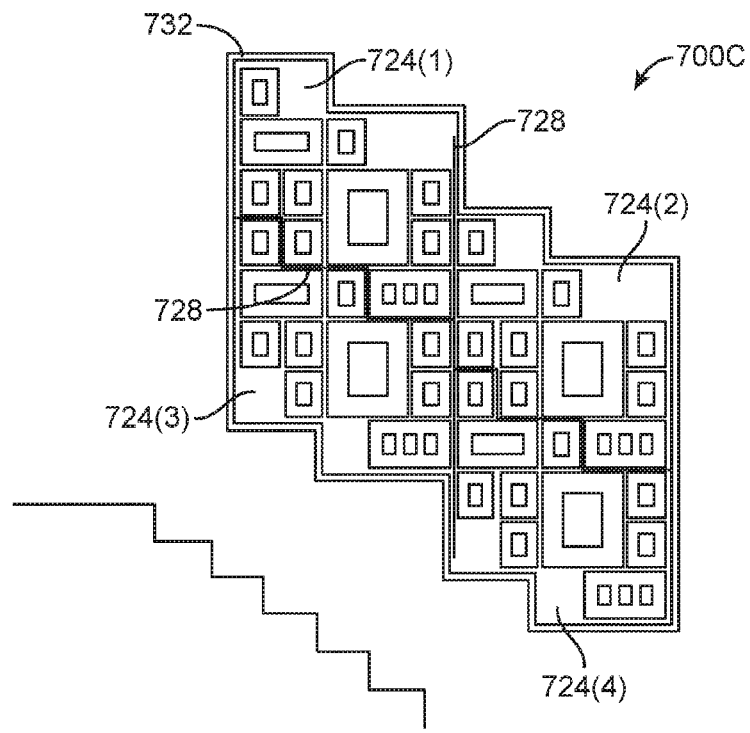
FIG. 7C is a partial diagrammatic/partial elevational view of four identical discrete stepped electronic modules arranged on a wall and electrically interconnected together in a side-by-side and stacked configuration.

FIG. 7C illustrates mosaicked display 700C as comprising four like stair-step-type display tiles 724(1) to 724(4) arranged two-over-two. Abutting edges (indicated by heavy lines 728) are electrically connected to one another via connector biscuits (hidden), such as any of the connector biscuits shown and/or described elsewhere in this disclosure. In the cases of the connection between display tiles 724(1) and 724(2) and the connection between display tiles 724(3) and 724(4), their alignment with one another is precisely controlled by the connector biscuits therebetween. In this example, display tiles 724(1) to 724(4) and the interconnecting connector biscuits may be magnetically engaged with an underlying non-magnetized ferromagnetic sheet 732 that may have the same shape as the outline of mosaicked display 700C.

Figure 7D:
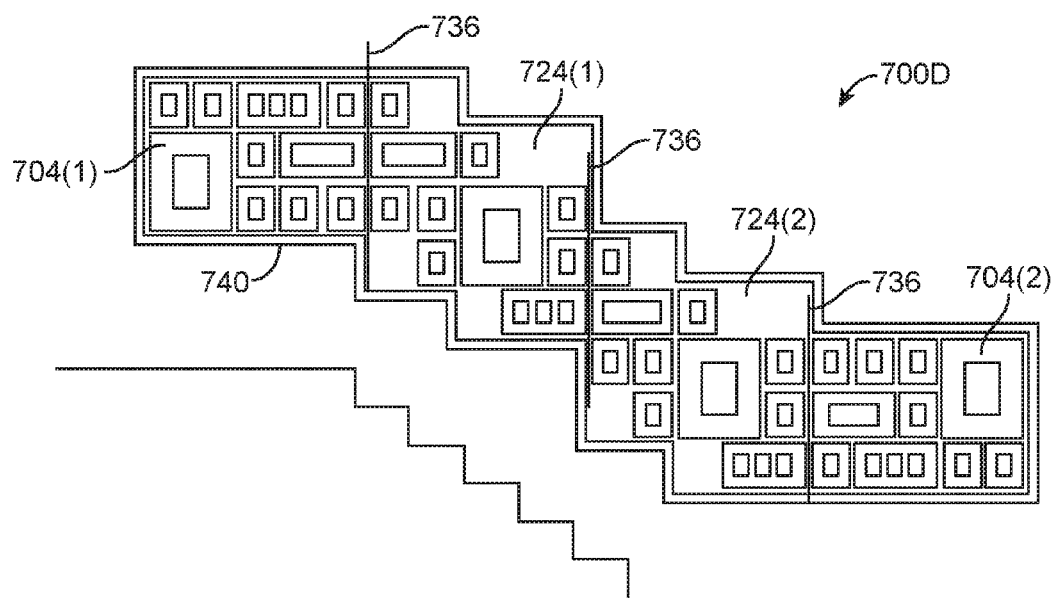
FIG. 7D is a partial diagrammatic/partial elevational view of two identical discrete stepped electronic modules and two identical discrete rectangular electronic modules arranged on a wall and electrically interconnected together in a side-by-side configuration.

FIG. 7D illustrates two rectangular display tiles 704(1) and 704(2) of FIGS. 7A and 7B and two stair-step-type display tiles 724(1) and 724(2) of FIG. 7C, arranged side-by-side to provide yet another differently configured mosaicked display 700D. Abutting edges (indicated by heavy lines 736) are electrically connected to, and at least partially aligned with, one another using connector biscuits (hidden), such as the connector biscuits described elsewhere herein. In this example, display tiles 704(1), 704(2), 724(1), and 724(2) and the interconnecting connector biscuits may be magnetically engaged with an underlying non-magnetized ferromagnetic sheet 740 that may have the same shape as the outline of mosaicked display 700D. These are but a few of the virtually endless number of arrangements that are possible using discrete electronic modules and electrical biscuit connectors of the present disclosure.

Figure 8:
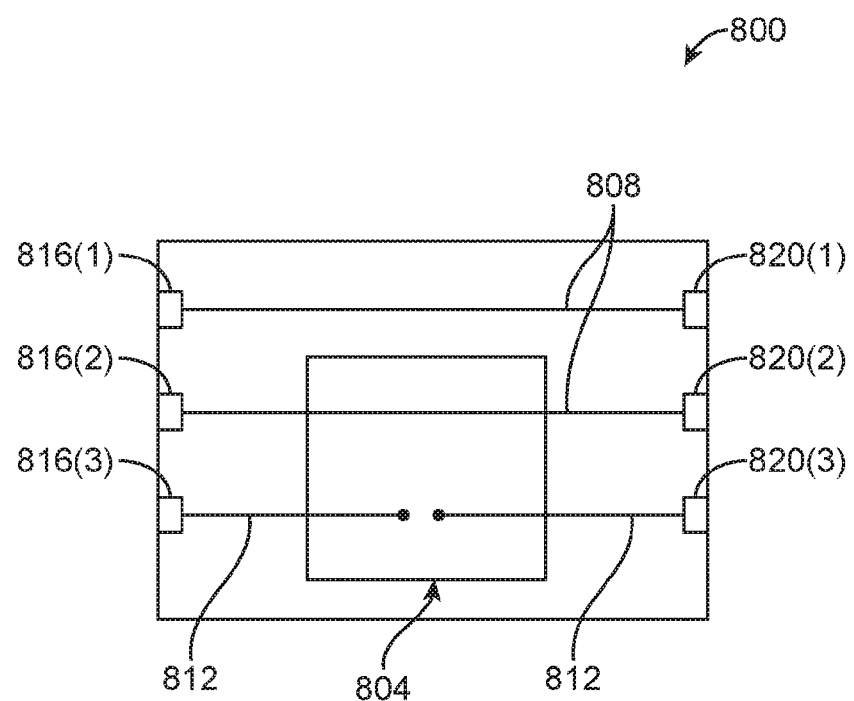
FIG. 8 is a high-level block diagram of an active connector biscuit made in accordance with aspects of the present invention.

FIG. 8 illustrates an exemplary active connector biscuit 800 that has onboard electronics 804 for providing the connector biscuit with any one or more of a variety of functionalities, including, but are not limited to, signal processing (e.g., conditioning, conversion, amplification, etc.), signal routing, power conversion (e.g., stepping voltage/current) and power distribution, serializing, deserializing, communications with offboard controllers, communications with other connector biscuits, and any combination thereof. Correspondingly, examples of onboard electronics 804 include, but are not limited to, one or more signal processors, one or more signal routers, one or more power converters, one or more serializers, one or more deserializers, one or more power distribution systems, and one or more communications devices (such as RF, microwave, or optical transmitters, receivers, or transceivers), and any combination thereof needed to satisfy any particular functionality or set of functionalities a designer provides to connector biscuit 800. Fundamentally, there is not limitation on the nature and character of onboard electronics 804 other that it can be physically incorporated into connector biscuit 800. Onboard electronics 804 may be powered in any suitable manner, such as by one or more wired or wireless power sources and/or power source (not shown) located onboard connector biscuit 800.

Depending on the operating principle(s) on which the display mosaic system, such as any one of the systems disclosed herein, in which connector biscuit 800 is deployed, connector biscuit 800 may include zero or more pass-through channels 808 that pass through one or more corresponding signals either directly, i.e., by "bypassing" onboard electronics 804, or indirectly through the onboard electronics, for example, for processing, conditioning, serializing, deserializing, etc. In addition, or alternatively, connector biscuit 800 may include zero or more "hub" channels 812 that each carry one or more signals from an onboard receiver (transceiver), onboard power source, and/or wireless power source, etc., that make up all or part of onboard electronics 804 to one or each display tile (not shown), such as any one or more of the display tiles described herein, to which the connector biscuit is operatively connected. In addition, or alternatively to one, the other, or both, of pass-through channel(s) 808 and receiving-type hub channels 812, connector biscuit 800 may include zero or more transmitting-type hub channels (also represented by hub channels 812) that each carry one or more signals to an onboard transmitter (transceiver) that makes up all or part of onboard electronics from one or each display tile (not shown) to which the connector biscuit is operatively connected.

All signal and/or power communications between connector biscuit 800 and each display tile (not shown) with which the connector biscuit is in operative communication may be via one or more interface points, such as interface points 816(1) to 816(4) and 820(1) to 820(4), that are operationally matched with corresponding interface points (not shown) on the display tile(s) to which the connector biscuit is operatively connected. Examples of interface points suitable for each/any of interface points 816(1) to 816(4) and 820(1) to 820(4) include, but are not limited to, electrical contacts for wired modes, optical emitters and corresponding optical detectors for optical modes, RF transmitters and receivers for RF modes, microwave transmitters and receivers for microwave modes, and electromagnets and induction coils for magnetic induction modes, among others. Those skilled in the art will readily understand how to implement operationally matched interface points 816(1) to 816(4) and 820(1) to 820(4) on connector biscuit 800 for any chosen communications and/or power transmission mode.

Figure 9A:
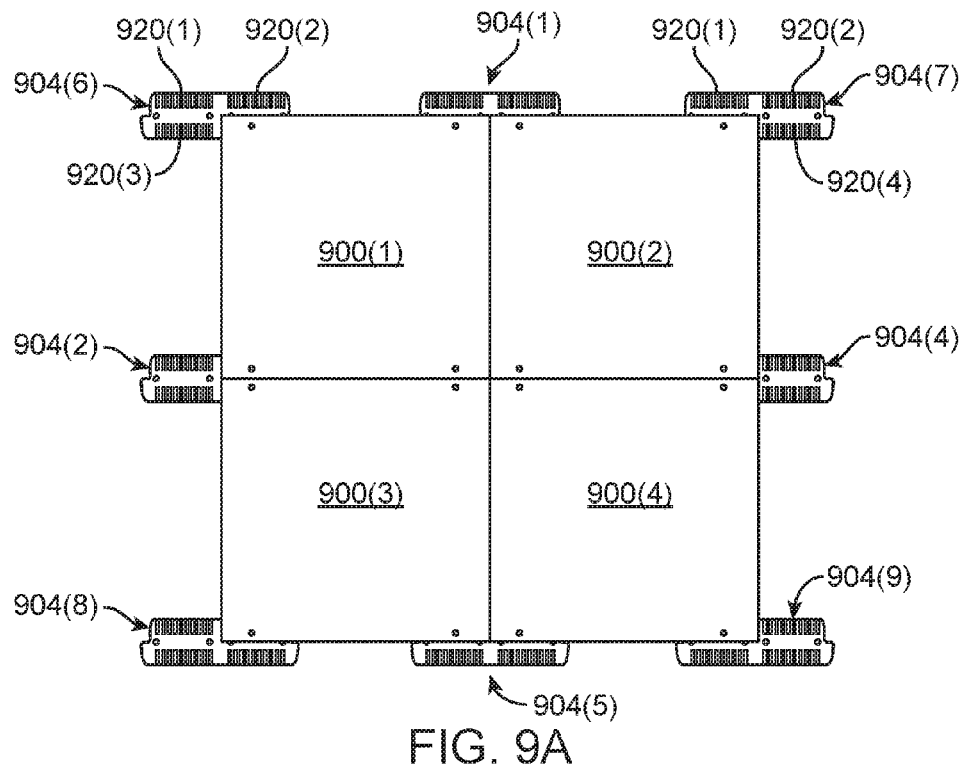
FIG. 9A is a front elevational view of a portion of a mosaicked display in which the display tiles have recessed receptacles located at their corners and designed and configured to engage corresponding connector biscuits.
Figure 9B:
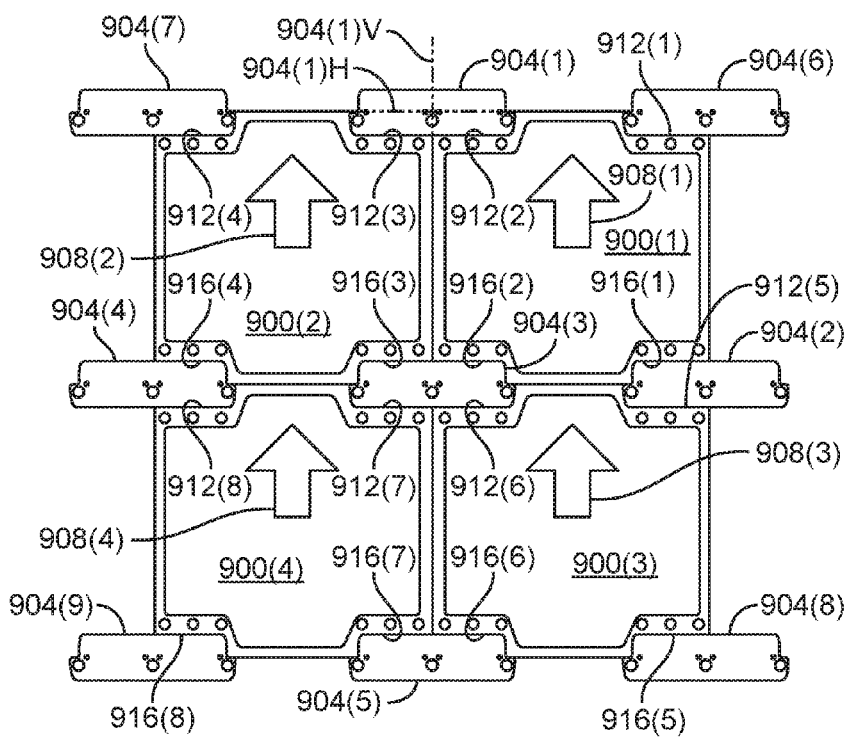
FIG. 9B is a rear elevational view of the portion of the mosaicked display of FIG. 9A, showing the back sides of the display tiles and connector biscuits.

FIGS. 9A and 9B illustrate four display tiles 900(1) to 900(4) mosaicked together using five connector biscuits 904(1) to 904(5) to form a portion of a larger mosaicked display (not shown). Four additional connector biscuits 904(6) to 904(9) are shown engaged with corresponding respective ones of display tiles 900(1) to 900(4) for interconnecting the display tiles with other display tiles and/or other type(s) of electronic modules (not shown), such as power and/or driver modules. In this example, each connector biscuit 904(1) to 904(9) has only one axis of symmetry, here its vertical axis, such as vertical axis 904(1)V (FIG. 9B) for connector biscuit 904(1). Each connector biscuit 904(1) to 904(9) is asymmetrical about its horizontal axis, such as horizontal axis 904(1)H (FIG. 9B) for connector biscuit 904(1). This is so in this particular design because display tiles 900(1) to 900(4) are designed and configured to be deployed in a particular orientation as indicated by directional arrows 908(1) to 908(4) (FIG. 9B) on the display tiles that indicate which edges of the tiles are to be at the top. Correspondingly, upper recessed receptacles 912(1) to 912(8) at the upper corners of display tiles 900(1) to 900(4) and lower recessed receptacles 916(1) to 916(8) at the lower corners of the display tiles are suitable sized and shaped to snugly engage the corresponding respective portions of the corresponding connector biscuits 904(1) to 904(9) to properly align the display tiles with one another. Specifically in this example, each upper recessed receptacle 912(1) to 912(8) is longer that each lower recessed receptacle 916(1) to 916(8) to accommodate the longer portions of the connector biscuits.

In this example, connector biscuits 904(1) to 904(9) are identical to one another and each includes four interface points 920(1) to 920(4) (only some labeled for convenience) for interfacing with four display tiles (like display tiles 900(1) to 900(4)) or fewer than four display tiles and one or more other electronic module(s). Also in this example, each interface point 920(1) includes a multi-contact electrical connector having 24 contact members for electrically contacting 24 matching contact members within each recessed receptacle 912(1) to 912(8) and 916(1) to 916(8). The electrical connectivity of interface points 920(1) to 920(4) depends on the design of display tiles 900(1) to 900(4) themselves as well as the overall mosaicked display system (not shown) of which they are part. Those skilled in the art will readily understand how to interconnect interface points 920(1) to 920(4) with one another according to the design parameters and/or how to connect the interface points with onboard electronics (not shown), if any, such as in any of the manners described elsewhere herein.

Figure 10:
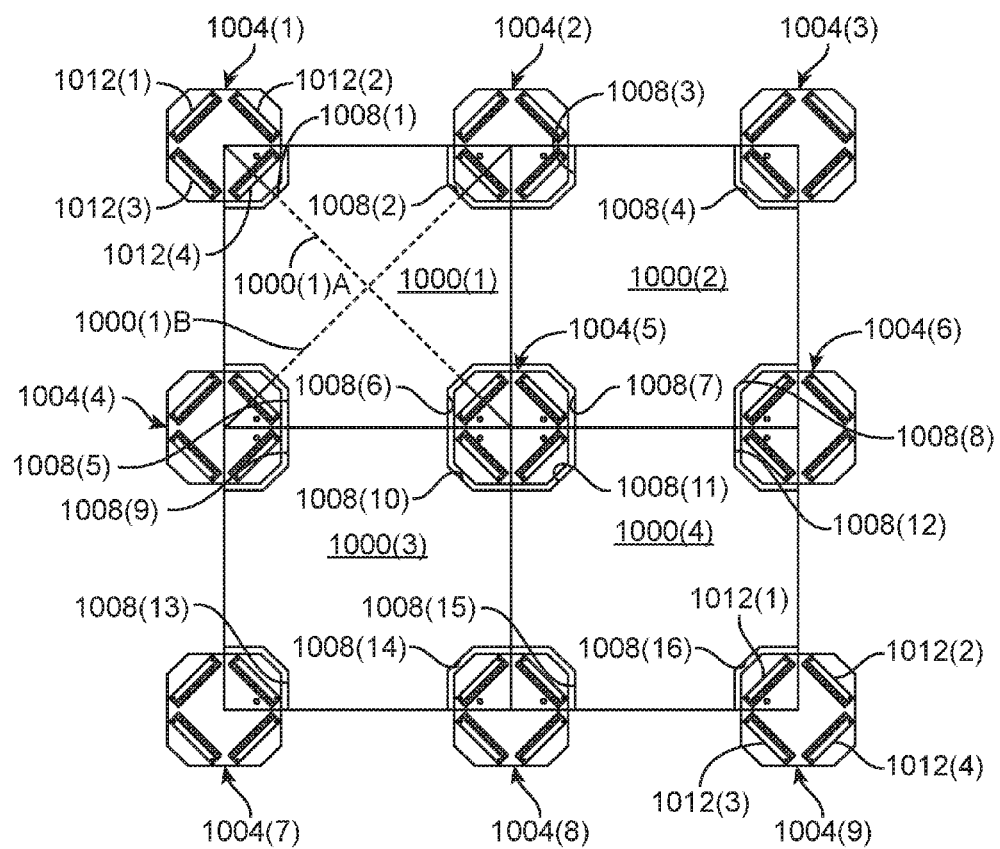
FIG. 10 is a front elevation/schematic diagram illustrating a portion of a mosaicked display in which the display tiles (illustrated as being translucent for sake of illustration) have alternative recessed receptacles located at their corners and designed and configured to engage corresponding rotationally symmetric connector biscuits.

FIG. 10 illustrates another configuration of corner-connected display tiles, here display tiles 1000(1) to 1000(4), in which the connector biscuits used to interconnect the display tiles, here connector biscuits 1004(1) to 1004(9), are rotationally symmetric about their centers of gravity. Correspondingly, each display tile 1000(1) to 1000(4) includes four recessed receptacles 1008(1) to 1008(16), each of which is physically symmetrical about a corresponding tile diagonal, such as diagonals 1000(1)A and 1000(1)B of display tile 1000(1). In this example, connector biscuits 1004(1) to 1004(9) are identical to one another and each includes four interface points 1012(1) to 1012(4) (only some labeled for convenience) for interfacing with four display tiles (like display tiles 1000(1) to 1000(4)) or fewer than four display tiles and one or more other electronic module(s). In this example, each interface point 1012(1) to 1012(4) includes a multi-contact electrical connector having 24 contact members for electrically contacting 24 matching contact members within each recessed receptacle 1008(1) to 1008(16). The electrical connectivity of interface points 1012(1) to 1012(4) depends on the design of display tiles 1000(1) to 1000(4) themselves as well as the overall mosaicked display system (not shown) of which they are part. Those skilled in the art will readily understand how to interconnect interface points 1012(1) to 1012(4) with one another according to the design parameters and/or how to connect the interface points with onboard electronics (not shown), if any, such as in any of the manners described elsewhere herein.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A connector designed and configured to operatively connect together first and second electronic modules when the first and second electronic modules are directly abutting one another, wherein the first electronic module includes a first back face and a first recess formed in the first back face and containing a first recessed receptacle having at least one first interface point and a first interior shape, and the second electronic module includes a second back face and a second recess formed in the second back face and containing a second recessed receptacle having at least one second interface point and a second interior shape, the connector comprising:
a rigid body having first and second ends spaced from one another, wherein:
the first end is designed and configured to matingly engage the first recess and has a first exterior shape that conformally abuts the first interior shape when the first end is matingly engaged with the first recess; and
the second end is designed and configured to matingly engage the second recess and has a second exterior shape that conformally abuts the second interior shape when the second end is matingly engaged with the second recess;
at least one third interface point located at the first end of the rigid body, the at least one third interface point designed and configured to operatively interface with the at least one first interface point of the first recessed receptacle on the first electronic module when the first end is matingly engaged with the first recess; and
at least one fourth interface point located at the second end of the rigid body, the at least one fourth interface point designed and configured to operatively interface with the at least one second interface point of the second recessed receptacle on the second electronic module when the second end is matingly engaged with the second recess.

2. The connector according to claim 1, wherein the at least one third interface point and the at least one fourth interface point are in operative communication with one another so as to provide operative communication between the first and second electronic modules when the connector is engaged with the first and second recesses.

3. The connector according to claim 1, further comprising active electronics, wherein the at least one third interface point and the at least one fourth interface point are in operative communication with the active electronics.

4. The connector according to claim 3, wherein the active electronics comprise a receiver designed and configured to receive and output one or more signals to the at least one third interface point.

5. The connector according to claim 1, wherein each of the at least one first through at least one fourth interface points comprises one or more electrical contacts.

6. The connector according to claim 1, wherein further comprising a permanent magnet designed and configured to attract the connector toward a ferromagnetic support structure when the first and second electronic modules are supported by the ferromagnetic support structure and the connector is engaged with the first and second recesses.

7. The connector according to claim 1, wherein:
each of the first and second back faces confronts a support structure when the first and second electronic modules are deployed for use;
the at least one first interface point facing the support structure when the first electronic module is deployed for use;
the at least one second interface point facing the support structure when the second electronic module is deployed for use;
the rigid body includes a front side facing away from the support structure when the connector is deployed for use with the first and second electronic modules;
the at least one third interface point located on the front side of the rigid body; and
the at least one fourth interface point located on the front side of the rigid body.

8. The connector according to claim 7, wherein each of the third and fourth interface comprise spring contacts.

9. The connector according to claim 7, further comprising means for securing the connector to the support structure independently of the first and second electronic modules.

10. The connector according to claim 9, wherein the means for securing includes a magnet engaged with the rigid body for magnetically securing the connector to the support structure.

11. The connector according to claim 1, wherein:
the first recess of the first electronic module has a first size;
the second recess of the second electronic module has a second size different from the first size; and
the first and second ends of the rigid body are sized differently so as to conformally engage with corresponding differing ones of the differently sized first and second recesses.

12. An electrical connector designed and configured to electrically connect together first and second electronic modules that are secured to a support structure in abutting relation with one another, comprising:
a body having:
first and second ends spaced from one another;
a back side designed and configured to confront the support structure when the electrical connector is deployed for use; and
a front side spaced from the back side;
means for securing the body to the support structure when the electrical connector is deployed for use, the means for securing the body able to secure the body to the support structure independently of the pair of abutting electronic modules;
a first set of electrical contacts located at the first end of the body, the first set of electrical contacts designed, configured, and located to contact a corresponding second set of electrical contacts of the first electronic module when the electrical connector and the first and second electronic modules are deployed together for use; and
a third set of electrical contacts located at the second end of the body, the third set of electrical contacts designed, configured, and located to contact a corresponding fourth set of electrical contacts of the second electronic module when the electrical connector and the first and second electronic modules are deployed together for use.

13. The electrical connector according to claim 12, wherein the electrical contacts of the first set of electrical contacts are electrically coupled directly to corresponding electrical contacts of the third set of electrical contacts so that the electrical connector functions as an electrical pass-through connector.

14. The electrical connector according to claim 12, further comprising active electronics, wherein the first set of electrical contacts and the third set of electrical contacts are in electrical communication with the active electronics.

15. The electrical connector according to claim 12, wherein the first set of electrical contacts and the third set of electrical contacts are located on the front side of the body.

16. The electrical connector according to claim 15, wherein the first and third sets of electrical contacts are spring-biased contacts.

17. The electrical connector according to claim 15, wherein the second and fourth sets of electrical contacts are spring-biased contacts and the first and third sets of electrical contacts are fixed contacts.

18. The electrical connector according to claim 12, wherein:
the first electronic module has a first back face containing a first recess;
the second electronic module has a second back face containing a second recess; and
the first and second ends of the body of the electrical connector are shaped so as to conformally engage with the first and second recesses when the electrical connector and first and second electronic modules are deployed together for use.

19. The electrical connector according to claim 18, wherein:
the first recess has a first size;
the second recess has a second size different from the first size; and
the first and second ends of the body are sized differently so as to conformally engage with corresponding differing ones of the differently sized first and second recesses when the electrical connector and first and second electronic modules are deployed together for use.

20. The electrical connector according to claim 12, wherein means for securing the body to the support structure comprises a magnet.

* * * * *